United States Patent [19]
Walpole et al.

[11] Patent Number: 5,029,198
[45] Date of Patent: Jul. 2, 1991

[54] TELEPHONE CALL RESPONDING SYSTEM AND CONTROL METHOD AND DEVICE THEREFOR

[75] Inventors: Geary A. Walpole, 37 Thackeray Rd., Oakland, N.J. 07436; Robert S. Choi, Landisville, Pa.; C. Kwai Kong, Mount Joy, Pa.; Jude Buckwalter, Willow Street, Pa.

[73] Assignee: Geary A. Walpole, Oakland, N.J.

[21] Appl. No.: 466,644

[22] Filed: Jan. 17, 1990

[51] Int. Cl.[5] .................. H04M 1/21; H04M 1/64
[52] U.S. Cl. .................................. 379/88; 379/52; 379/67; 379/87
[58] Field of Search .................. 379/88, 67, 52, 51, 379/48, 76, 87, 70

[56] References Cited

U.S. PATENT DOCUMENTS

| | | | |
|---|---|---|---|
| 3,504,121 | 3/1970 | Riley | 379/69 |
| 3,777,065 | 12/1973 | Galian et al. | 379/159 |
| 4,001,508 | 1/1977 | Johnson | 379/69 |
| 4,371,751 | 2/1983 | Hilligoss, Jr. et al. | 379/41 |
| 4,517,410 | 5/1985 | Williams et al. | 379/73 |
| 4,623,761 | 11/1986 | Winter et al. | 379/84 |
| 4,697,282 | 9/1987 | Winter et al. | 379/67 |
| 4,908,845 | 3/1990 | Little | 379/51 |

FOREIGN PATENT DOCUMENTS

| | | | |
|---|---|---|---|
| 0057854 | 8/1982 | European Pat. Off. | 379/88 |
| 0092084 | 10/1983 | European Pat. Off. | 379/88 |
| 3307169 | 9/1984 | Fed. Rep. of Germany | 379/88 |
| 3540301 | 5/1987 | Fed. Rep. of Germany | 379/88 |
| 0136467 | 7/1985 | Japan | 379/88 |

OTHER PUBLICATIONS

Cheairs, L. S., "Build This Speech Synthesizer", Radio-Electronics, vol. 53, No. 7, Jul. 1982, pp. 43-46, 110.
Reese, R. et al., "Speech Board Makes Anything Talk", Computers & Electronics, vol. 20, No. 12, Dec. 1982, pp. 47-48, 55-62.
Dighera, L., "Talk Can be Cheap", Computers & Electronics, vol. 21, No. 2, Feb. 1983, pp. 39-40, 47-49, 51.
Glinsky, L., "Build This Talking Alarm Clock", Radio-Electronics, vol. 54, No. 5, May 1983, pp. 57-60, 106.
"Claudivs Converse", *British Telecommunications Engineering*, vol. 4, Jul. 1985, p. 116.

*Primary Examiner*—Thomas W. Brown
*Attorney, Agent, or Firm*—Marc A. Miller

[57] ABSTRACT

A telephone call responding system which allows the user to respond to an incoming telephone call without actually speaking to the caller personally, and, if desired, without having to pick up the telephone to answer a call. To activate the responder system, the user, upon receiving an incoming telephone call, selects one of a plurality of call response messages by actuating a control key of the responder system corresponding to the desired message. Once activated, the responder system connects itself to the telephone line and, utilizing speech synthesis or digital-to-analog conversion, delivers the selected message for putting-off an unwanted or nuisance call, asking the caller to call back later, or instructing a person on an extension telephone to hang up. After delivering the message, the responder system disconnects itself from the telephone line until once again activated by the user. The digital message data are pre-programmed into interchangeable plug-in non-volatile ROM units and different messages can be set up for selection. The responder system is digitally controlled, and a control method and program therefor are described. Various devices embodying the responder system are also described.

19 Claims, 15 Drawing Sheets

RESPONDER SYSTEM DIAGRAM

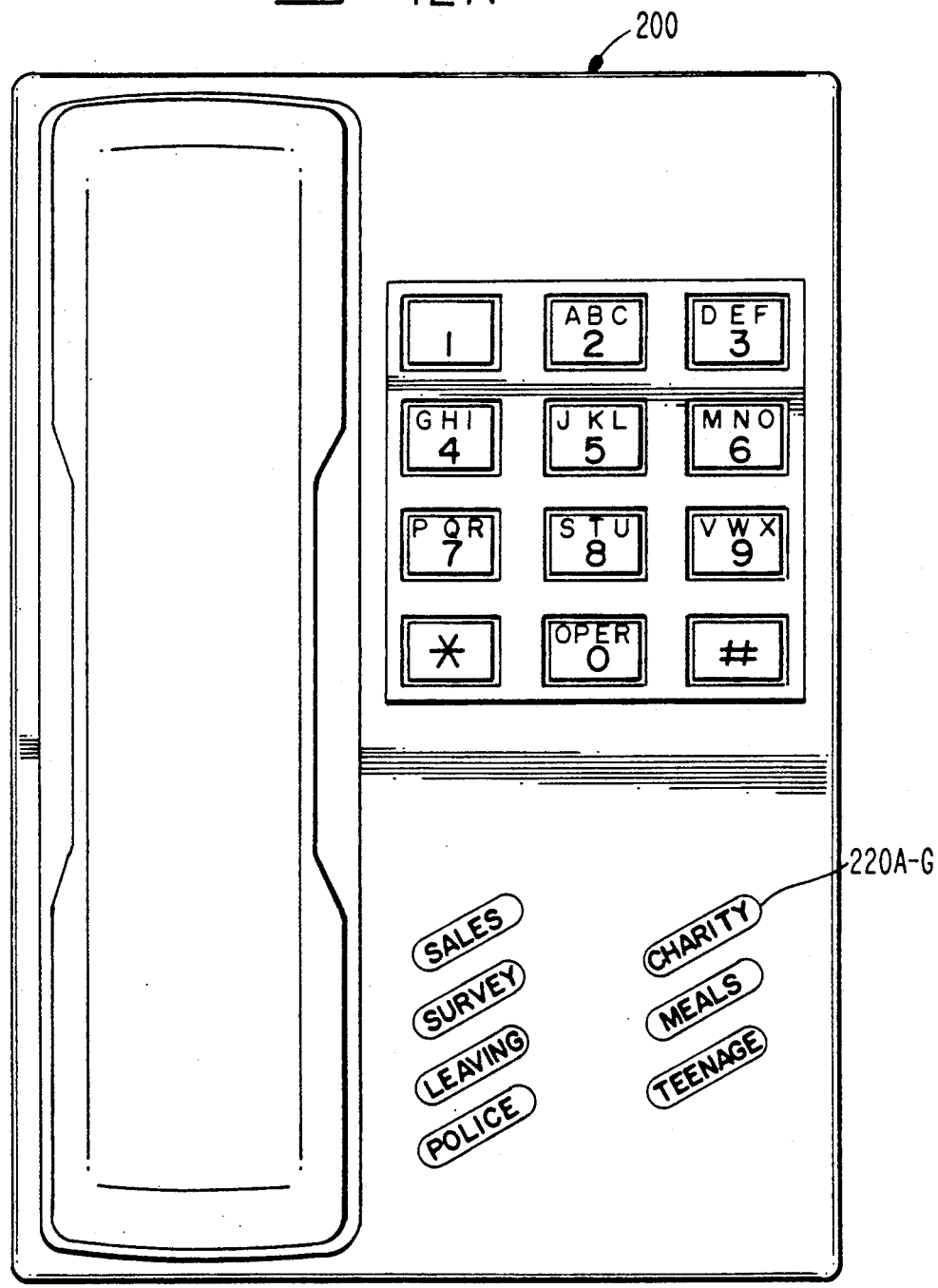

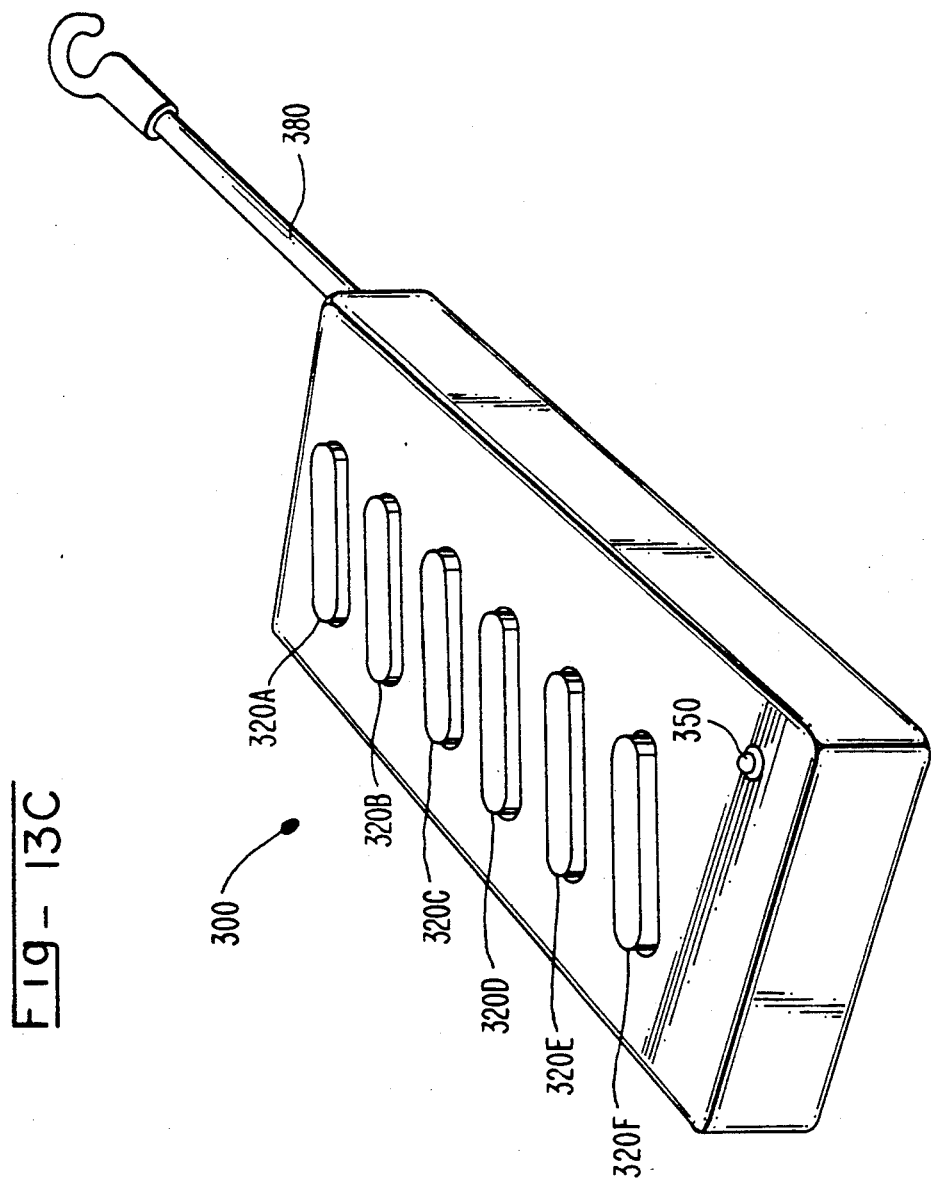

TELEPHONE CALL RESPONDING SYSTEM AND CONTROL METHOD AND DEVICE THEREFOR

BACKGROUND AND SUMMARY OF THE INVENTION

The present invention relates generally to telecommunication and telephone devices.

More particularly, the present invention pertains to a system, method and device for, under the selective control of and at the option of a user, either answering an incoming telephone call or interrupting a connected call already answered by the user or previously initiated from a telephone on the user's line and already in progress, and then delivering a desired one of a plurality of verbal messages over the user's telephone line to the calling party or another party on the user's line, and then, after delivering the desired verbal message over the telephone line, either disconnecting the call to the user's telephone or reestablishing the call in progress. It is a primary purpose of the present invention to provide a means for delivering appropriate verbal messages over the telephone for responding to unwanted telephone calls and for freeing the user's telephone line. In the following description, the invention will be generally referred to as a telephone "responder".

The telephone, while an essential means of communication, is frequently a source of disturbance and annoyance to telephone subscribers, and unwanted telephone calls are often looked upon as a nuisance and an invasion of privacy by the called party.

Telephone answering machines are commonly employed not only for the unattended automatic answering of incoming telephone calls and the recording of callers' messages in the absence of the called party, but also for "call screening" where the called party is in fact present to answer the telephone but instead chooses to allow the answering machine to answer an incoming call and deliver a prerecorded outgoing message to the caller, whereupon the called party then waits for the caller to leave an incoming message identifying himself/herself, and whereby the called party is able to identify the caller before actually picking up the telephone receiver to speak to the caller, in which way the called party is able to screen callers and choose only to speak with those callers he or she desires to speak with. However, the use of telephone answering machines for call screening has disadvantages, in that some callers with whom the called party may in fact wish to speak may, for various reasons, hang up when an answering machine answers their call, terminating the call without identifying themselves, and thus the called party may miss a call he or she otherwise would have taken.

The so-called practice of "telemarketing" is being more and more widely employed by various persons, organizations and businesses for making sales, survey and solicitation calls to telephone subscribers, however, many people receiving calls from telemarketers find such calls to be disturbing and annoying, especially during mealtimes or evening hours as is frequently the case.

The public subscriber telephone companies offer "unlisted" telephone numbers, often at additional cost, to those telephone subscribers who wish to restrict access to their telephone number listings, however even an unlisted telephone number may receive unwanted sales and solicitation calls due to the use by telemarketers of automatic telephone number selection and dialling equipment.

More recently, there are being implemented by some telephone service providers certain service features made possible by the computerization of the public switched telephone network switching functions, by which subscribers having required special display telephones or ancillary display devices are able to identify the telephone number of a calling party before answering a call, and even to program their telephones not to accept, i.e. to "block" calls from certain callers' telephone numbers. However, such features entail not only additional subscriber charges but also the purchase of expensive display telephone equipment for their utilization, and are presently only available in limited service areas. Also, in practice the call blocking feature may typically still require that a telephone call first be received before it can be determined whether the call from that certain caller's number being then displayed is an unwanted call to be blocked in the future, and, typically, only a limited number of caller numbers to be blocked may be programmed for such action. Thus it may still occur that unwanted calls from new callers will be received, necessitating that these calls be taken, and thus still subjecting the called party to unwanted calls.

Still further, because the telephone is such an essential means of communication for the public, many telephone subscribers consider it most necessary to receive all telephone calls in case a call may be important, yet at the same time they find being constantly bombarded with endless sales and solicitation calls to be a nuisance. Moreover, having answered an unwanted sales or solicitation call, many people are uncomfortable about how to handle the situation, not wishing to appear rude to the caller but being unable to politely cut-off the caller's sales pitch long enough to terminate the call in as civil a manner as possible. Thus, the reception of unwanted telephone calls raises the often psychologically demanding problem of dealing with such calls.

When faced with an unwanted sales, survey or solicitation call, it would be most convenient to be able to respond to such a call in an appropriate and civil manner by delivering a message advising the caller that the call is not wanted and then hanging up the phone, all at the push of a button and without having to personally deal with the caller.

Additionally, there are times when, such as during mealtimes or when otherwise occupied, some telephone subscribers may not then desire take incoming telephone calls, but may nevertheless wish the calling parties to call back at a later, more convenient time. Some telephone answering machines provide an operating mode for automatically answering a call and delivering an outgoing message, for example to advise callers to call back later, without recording an incoming message from the caller. However, conventional answering machines can only deliver a single outgoing message, so that it becomes necessary for the user to first record one outgoing message, for example at mealtime, requesting callers to call back later, and to then set the machine in a mode only to deliver the outgoing message, while at other times when the user is going out and wishes to receive messages from callers, a different message must be recorded and the machine must be set to another mode for recording incoming messages from callers. Further, telephone answering machines are relatively expensive.

Thus, at such times when the telephone subscriber is occupied and is not able or does not desire to speak with callers but nevertheless desires callers to call back later, it would be convenient to be able to respond to a call and deliver an appropriate message advising the caller that the called party is not then able to take the call at that time and requesting the caller to call back at a later, more convenient time, and then to disconnect the caller, all at the push of a button and without requiring the use of an expensive telephone answering machine.

The present invention has as one of its objects the provision of a means by which telephone calls may be answered by the called party to permit the caller to identify himself/herself and the purpose of the call, and, if it should appear to the called party that the call is an unwanted call, then at the touch of a button by the called party an appropriate message may be automatically delivered to the caller prior to automatic termination of the telephone connection.

The present invention has as another of its objects the provision of a means by which, at times when a telephone subscriber is not able or does not then wish to take incoming telephone calls but wishes callers to call back at a later time, an incoming telephone call may be responded to by, at the touch of a button by the called party, being automatically answered, and an appropriate message delivered to the caller requesting the caller to call back at a later time, and then disconnecting the caller.

In addition to screening unwanted calls and advising callers to call back at a later time, there are occasions when it may be desirable to deliver an appropriate message to persons on the telephone subscriber's line, for example, a party on an extension telephone on the subscriber's premises and engaged in a telephone conversation with a party connected with the subscriber's line, to advise the parties to free the telephone line or to terminate the conversation. Thus for example, when a teenager is using the phone to converse with a friend, it would be convenient for a parent to be able, at the touch of a button, to deliver an appropriate message over the telephone line to the parties on the line advising them that the line is required for placing another call and requesting that the conversation therefore be shortly concluded to free the line. Similarly, it might be desirable for the parent to be able, at the touch of a button, to interrupt a conversation in progress on the telephone line and deliver an appropriate message advising the parties on the line that it is mealtime, homework time, etc., and then permit the parties to conclude their conversation.

It is therefore another object of the present invention to provide a means for, at the touch of a button, interrupting a call in progress on a telephone subscriber's line and delivering an appropriate message to parties on the line.

The present invention may be embodied in an electronic telephone call responding device which is connectable or interfaceable with the user's telephone line and which operates to allow the user to conveniently respond to an incoming telephone call without speaking to the caller personally. The device will typically include a plurality of user-actuatable control keys or buttons each associated with a particular message appropriate to a different situation or circumstance. In operation, when the telephone rings, the user may answer the telephone as normally and then, if desired, actuate a selected key on the device to deliver a desired pre-programmed outgoing message to the caller, at the conclusion of which message the device will then automatically hang up, disconnecting the caller without further action by the user being necessary.

The telephone responder device according to the present invention also allows the user the option of responding to an incoming telephone call without actually answering (i.e. picking up) the ringing telephone but by merely actuating a selected control key or button on the device for causing the device to automatically answer the call, deliver a desired appropriate outgoing message to the caller, and then hang up to terminate the line connection.

The telephone responder device according to the present invention additionally allows the user the option, by actuating a selected control key or button of the device, of automatically interrupting a conversation in progress over an extension telephone on the user's line and delivering an appropriate message to the parties on the line, and then surrendering the line to allow the connected parties to resume their conversation without disconnecting the parties.

The telephone responder of the invention requires manual actuation and thus is not able to operate unattended. The user must first actuate the telephone responder by, for example, pressing a control key or button associated with a particular message to be delivered over the user's telephone line, and in this way the telephone responder's operation is initiated to connect the responder to the telephone line and deliver the selected message. While requiring manual actuation by the user, the telephone responder according to the present invention incorporates computer control of its operation once actuated by the user.

The present responder system accommodates a plurality of different messages each appropriate to a particular situation or circumstance. These messages are stored as digital data in user-installable plug-in message memory modules so as to be selectively generated therefrom upon user actuation of the device. The messages are stored as digital data in non-volatile solid state memory, and the responder system includes message generation means for reproducing the stored message data as an audio analog speech signal and for delivering the audio speech signal over the user's telephone line.

Advantageously, the present invention can employ various means and techniques for forming, reproducing or otherwise electronically "vocalizing" or generating verbal speech messages for delivery as audio speech signals over the telephone line. One of the available technologies which may be implemented for providing message speech generation in practicing the present invention is electronic speech synthesis from digital (i.e. binary) "vocabulary" and "speech" data stored in digital memory. In electronic speech synthesis, a speech synthesizer circuit utilizing excitation of a time-varying digital filter(s) operates to "reconstruct" a close analog of vocal speech from pre-recorded or pre-programmed digital message data including heavily compressed quantized speech data and formant filter control parameter data.

Another available technology implementable for message speech generation in the present responder system is digital-to-analog (D/A) conversion of quantized "speech" data stored in digital memory (i.e. "digital audio"). Embodiments implementing each of these technologies will be further described hereinbelow.

It is envisaged that manufacturers of telephone responder systems and devices in accordance with the present invention will provide a number of different pre-programmed or pre-recorded message data memory modules or "chips" each appropriate to a particular call response circumstance and each containing in digital data form a particular message for reproduction by the speech message generator means in the user's unit into an analog audio speech signal for delivery over the telephone line. This approach offers the advantage of simplicity and lower cost, since the end-user may choose from among a library of appropriate pre-programmed/pre-recorded messages to fit the user's particular circumstances for equipping his or her specific unit, without it being necessary to equip the user's unit with costly message recording facilities or complex message programming means. Another advantage of this approach is that, because the messages may be pre-programmed/pre-recorded to be reproduced in an authoritative or "official-sounding" voice, the generated messages will tend to engender respect and obedience in callers receiving such messages, while at the same time the user is advantageously freed from the sometimes difficult task of having to personally deal with an unwanted caller and framing and delivering an appropriate response message.

The telephone responder device according to the present invention may be implemented as a separate telephone accessory device or may be incorporated together with a handset and switching, dialling, speech, ringing and other circuits into a self-contained telephone unit. The responder device may also include remote control actuation capability. The telephone responder device of the invention is connectable to a telephone jack on the user's telephone line without any modification being necessary. In its form as a separate telephone accessory device, the telephone responder is installed by connecting it to a telephone line wall jack, and then connecting the user's telephone set to an appropriate jack provided on the responder device. When not actuated, the telephone responder device has no effect on the operation of the connected telephone set.

The present invention also resides in a method for controlling a telephone call responding system for responding to incoming telephone calls on a subscriber's telephone line, including the steps of operably connecting the responder system with the subscriber's telephone line and going "off-hook", generating and delivering a selected message over the telephone line, and then disconnecting both the responder system and the caller from the subscriber's line by going "on-hook". Optimally, the method according to the present invention is implemented as a series of program instructions for execution by a programmable computer control means of the telephone call responding system.

The present invention may be embodied in a telephone call responder system including a user input unit for system actuation and message selection, a telephone line interface unit for interfacing the responder system with a subscriber's telephone line, a message generation unit for processing digital message data of a selected verbal message to generate an analog audio speech message signal therefrom and for delivering the audio speech message signal over the subscriber's telephone line, and a programmable digital control unit for detecting user actuation and message selection and for controlling the operation of the user input unit, the telephone line interface unit and the message generation unit.

There have previously been known devices for verbal telephone message storage and retrieval. For example, Winter et al. U.S. Pat. Nos. 4,623,761 and 4,697,282 both disclose a voice recording, storage and retrieval system capable of presenting to a telephone caller a selected previously recorded message stored in memory and delivered via an audio interface. These disclosed systems are intended for use by a telephone company operator for recording and storing in memory a series of messages prepared by the operator, after which the system can be used by the operator in answering incoming calls and for delivering via a speech synthesizer one or more of the pre-recorded messages in a very close analog of the operator's "voice" to the caller, after which the conversation between the operator and caller may then proceed normally. A feature of these systems is that the operator records each message, and each reproduced message is a close analog of the original message as recorded so that callers are thus not able to detect that the message being delivered is in fact a recording.

Similarly, telephone companies typically employ conventional pre-recorded message or message "assembly" and delivery systems for various operations such as for advising directory assistance callers of requested telephone numbers.

However, such conventional telephone company message storage, reproduction/assembly and delivery systems require large computers, memories and switching systems and are complicated and expensive to implement, thus being unaffordable for individual consumer and subscriber use.

There are also known other types of devices for delivering pre-recorded response or information messages via telephone. For example, Williams et al. U.S. Pat. No. 4,517,410 discloses a device which enables a caller to select among a number of prerecorded information messages by pressing an appropriate tone-dialling button on a telephone keypad, whereby the selected message is automatically delivered to the caller over the telephone.

Riley U.S. Pat. No. 3,504,121 and Galian et al. U.S. Pat. No. 3,777,065 disclose automatic "wake-up" call signalling devices for use by hotel guests, these devices delivering a wake-up call message or signal to the guest's room telephone at a time selected or programmed by the guest operating his or her room telephone. And U.S. patent no. 4,001,508 to Johnson discloses automatically delivering a number of different pre-recorded messages to called telephones.

However, there has remained a need for a simple means of responding to incoming telephone calls and for delivering appropriate verbal messages over the telephone line which can be implemented at a relatively low cost so as to be affordable for use by consumers.

It is therefore still another object of the present invention to provide a simple means for responding to incoming telephone calls and for delivering appropriate call response messages over the telephone which can be implemented at moderate cost so as to be affordable for use by consumers.

In this regard, in comparison to the known call responding devices such as for example those disclosed in the above-noted U.S. Pat. Nos. 4,623,761 and 4,697,282 in which messages to be delivered to callers must first be prepared, that is, recorded by the operator using message recording facilities, the system and device according to the present invention advantageously eliminate the necessity for costly and complex message preparation/recording facilities and instead make use of pre-programmed or pre-recorded digital message data and thus only require message generation means for either speech-synthesizing desired messages from pre-programmed digital message data stored in memory, or for reproducing pre-recorded digital message data as analog speech, thereby freeing the user from having to frame and prepare appropriate response messages for various situations and offering affordability.

It is therefore yet still another object of the present invention to provide a telephone call responder system and device incorporating electronic message generation means and offering a plurality of user-selectable pre-programmed/pre-recorded call response messages.

BRIEF DESCRIPTION OF THE DRAWINGS

These and other objects, features and advantages of the present invention will be made more apparent from the following detailed description taken in conjunction with the accompanying drawings, in which like reference numerals designate like elements and steps among the various figures, and in which

FIGS. 12A and 12B are a plan view and a perspective view, respectively, showing a second embodiment of a telephone call responding device according to the present invention integrated with a telephone set; and FIGS. 13A, 13B and 13C are a plan view, right side view and perspective view, respectively, of a remote control unit for a third embodiment of a telephone call responding device according to the present invention.

DETAILED DESCRIPTION OF THE INVENTION

Responder System Overview

Figure 1:
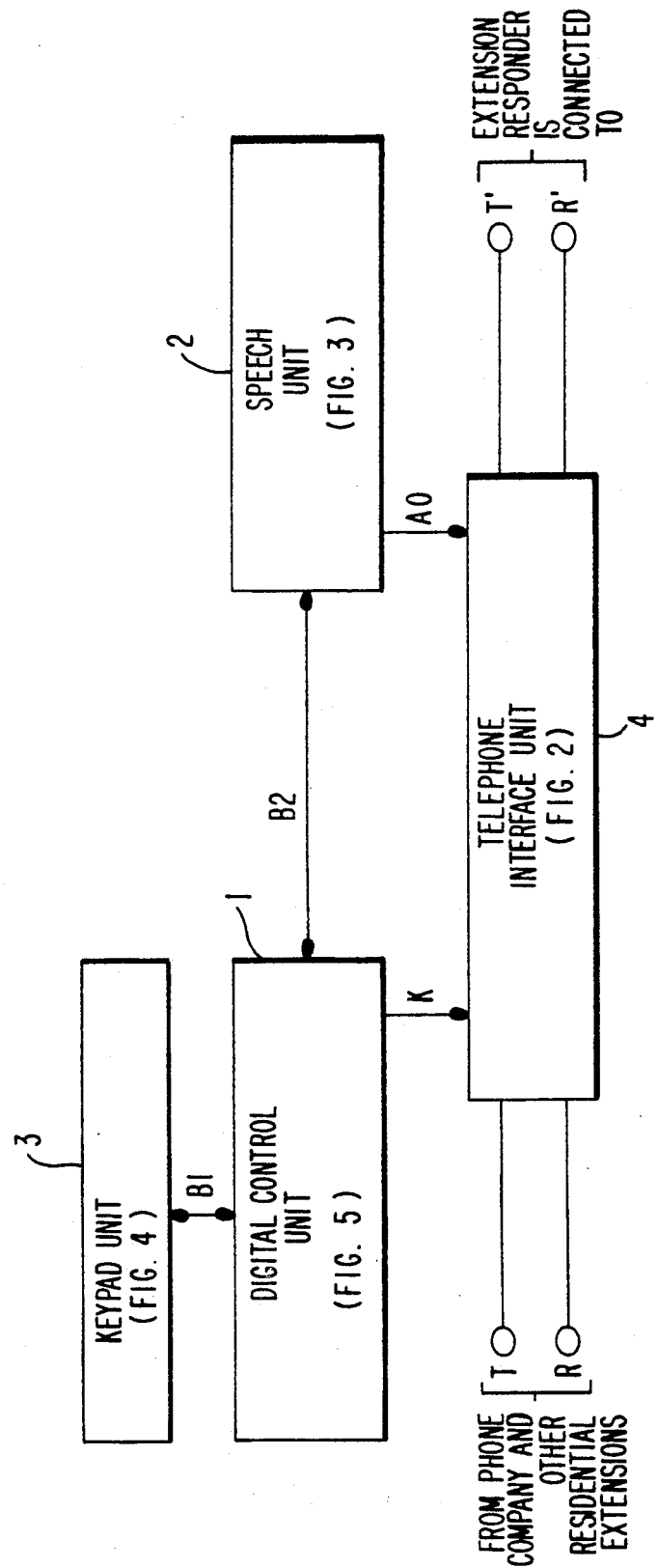
FIG. 1 is a generalized "hardware" block diagram of a telephone call responding system according to the present invention.

There will first be described the electronic telephone call responding system (hereinafter referred to simply as the "responder system") of the present invention. As noted above, this responder system is intended to allow the user to respond to an incoming telephone call without actually speaking to the caller personally, and, if desired, without having to pick up the telephone to answer a call. To activate the responder system, the user, upon receiving an incoming telephone call, selects one of a plurality of available call response messages by actuating a corresponding control key or button of the responder system. Once so activated, the responder system operably connects itself on the user's telephone line and, utilizing a speech message generation means, delivers the selected outgoing call response message for, e.g., putting-off an unwanted nuisance call, asking the caller to call back later, or instructing another member of the user's household on another telephone to hang up. After delivering the selected message, the responder system disconnects itself from the telephone line until once again activated by the user.

It should be understood that while the present responder system, once installed, is always "connected" to the user's telephone line in the sense of being installed as by a line cord connected to a wall outlet or other jack of the user's telephone service line, the responder system does not actively or "operably connect" to the user's telephone line until activated and has no effect upon the user's telephone line or upon the user's telephone set which may be installed in turn to the user's telephone service line by way of the responder system unless first activated by the user.

Generally, there are three cases or circumstances in which a user will activate the responder system:

I) If the user answers a call using the telephone and determines that the call is an unwanted call, e.g., from a salesperson or other nuisance caller to whom the user does not wish to listen or to speak with, the user may activate the responder system by actuating a control key or button on a keypad of the responder system to select an appropriate pre-programmed call response message, such as for example a "not interested" message, and then hang up the telephone, leaving the responder system to deliver the selected message to the caller and to then disconnect the caller from the user's telephone line.

II) If the user is busy or unable to answer the telephone or does not desire to then speak with a caller, the user may activate the responder system by actuating a control key or button on a keypad of the responder system to select an appropriate preprogrammed call response message such as, for example, a "call back later" message, whereupon the responder system will then answer the call by connecting itself to the telephone line and deliver the selected message to the caller, after which the responder system will then disconnect the caller from the user's telephone line, thereby freeing the user from actually having to personally answer the telephone.

III) If one member of the user's household is talking on an extension telephone and the user wishes to use the telephone, or if it is, for example, mealtime and the user wishes to instruct the person talking on the phone to conclude the conversation and get off the phone, the user may activate the responder system without picking up the telephone by simply actuating a control key button on a keypad of the responder system to select an appropriate preprogrammed message such as, for example, a "get off the telephone" message or a "time for dinner" message, whereupon the responder system will connect itself to the telephone line and deliver the selected message to be heard by the connected parties on the line and then disconnect itself from the telephone line without disconnecting the parties so as to enable the parties to conclude their conversation.

Thus, in cases (I) and (II), the responder system allows the user to terminate unwanted or nuisance calls without the user having to personally deliver the "bad news" or "call back" message to the caller, thus lessening the aggravation of having to deal with unwanted callers or calls received when the user is too busy to answer the phone or does not want to take phone calls. The responder system is activated and an appropriate call response message is selected and delivered automatically by the user's simply actuating a control button corresponding to the desired message, so that the user is not required to speak with the caller or even answer the phone.

The present telephone responder system may be configured to make any number of call response messages available to the user, for example eight different preprogrammed or pre-recorded messages may be made available for user selection. Preferably, these messages are pre-programmed or pre-recorded and stored in digital (i.e. binary) data form in interchangeable plug-in message memory modules or "chips" which the user may select to suit his or her needs. This arrangement permits the available pre-programmed/prerecorded message data in the responder system to be changed at any time by simply exchanging message memory modules and re-labeling the appropriate actuation key button(s) associated with the changed message(s).

The responder system is intended to work with all existing telephone installations without requiring modification to the user's existing telephone equipment. It should be emphasized that the telephone responder system of the present invention is not a telephone answering machine, that is, the present responder system does not automatically answer the user's telephone, but once manually actuated it does operate to automatically "pick up" the phone and also operates to automatically "hang up" the phone after delivering a message. Nor is the present responder system able to operate unattended. Rather, it is always required that the user manually activate the responder system before the responder system will operably connect to the telephone line and "pick up" the phone to "answer" an incoming call and deliver a selected message. However, because when it is not activated the responder system has no effect on the operation of other telephone equipment installed on the same telephone line, the responder system may even be installed in association with or combined together with a conventional telephone answering machine for permitting the unattended answering of incoming calls and the recording of incoming caller messages.

Referring now to FIG. 1, there is shown a generalized "hardware" block diagram of a telephone call responding system according to the invention. The system hardware includes four main functional blocks designated at 1 through 4, each of which main functional blocks 1-4 further include constituent functional blocks detailed and described hereinbelow in conjunction with subsequent figures.

Designated at 1 in FIG. 1 is a digital control unit which performs all system supervisory functions, for example, detecting when a user-actuatable control key button has been actuated by the user, issuing commands to "pick up" or "hang up" on the telephone line and controlling the flow of data to the speech unit.

Designated at 2 is a message speech unit which serves as the message generation means of the present invention. Message speech unit 2 operates to vocalize, process, translate or reproduce digital message data supplied to it by the digital control unit 1 into analog audio speech signals for the production of selected call response messages for delivery over the telephone line. The message speech unit 2 will be further described in detail below.

Designated at 3 is a keypad unit which serves as the user interface for manually activating all responder system functions. The keypad unit 3 is periodically scanned by the digital control unit 1 to determine if any system functions have been activated by the user.

Designated at 4 is a telephone interface unit which is responsible for matching the responder system's interface impedance to the telephone line and for isolating and protecting the responder system circuitry from voltage or current transients which may occur on the telephone line. Telephone interface unit 4 is also responsible for "picking-up" or "hanging-up" on the telephone line and for operably connecting the audio message speech output of the message speech unit 2 to the telephone line as commanded by the digital control unit 1.

Telephone Interface Unit

Figure 2:
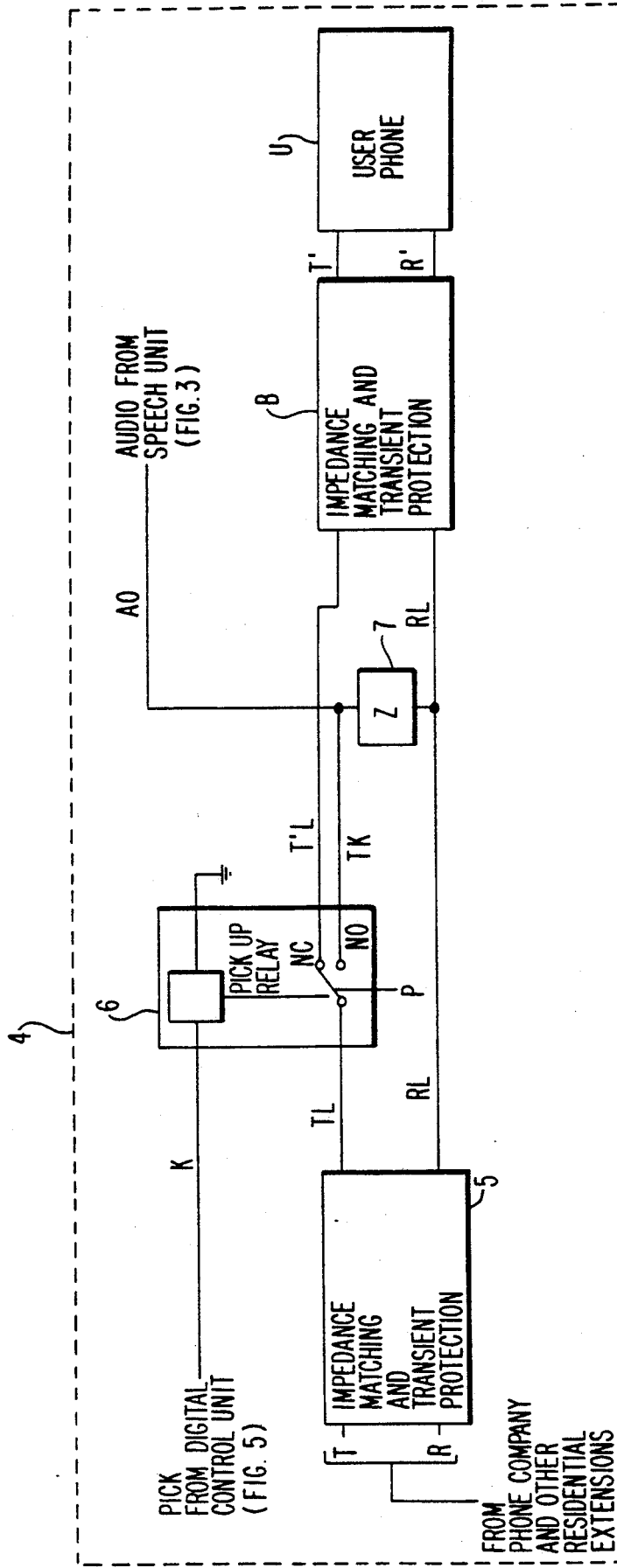
FIG. 2 is a detailed block diagram of the telephone interface unit, shown generally in FIG. 1.

With reference now also to FIG. 2, the telephone interface unit 4 will now be fully described. In FIGS. 1 and 2 there are shown entering the telephone interface unit 4 from the left-hand side a pair of wires T and R (e.g., the so-called "tip" and "ring" wires, also commonly designated as wires "L1" and "L2") making up a typical two-wire local loop subscriber telephone line for connecting a subscriber's telephone with the telephone company central office and the public switched telephone network. The details and characteristics of two-wire local loop subscriber telephone lines are per se well known to persons of ordinary skill in the telephony art and therefore do not require any further detailed explanation herein.

Shown exiting the telephone interface unit 4 from the righthand side are another pair of wires T' and R' to which may conveniently be connected (as by a provided jack on the responder system) a user telephone set U on the subscriber's premises to be used in conjunction with the responder system. Furthermore, in the case that more than one telephone is installed on the subscriber's premises, then the telephone line wire pair T-R may be an extension telephone line.

As shown in FIG. 2, the telephone interface unit 4 includes a pair of respective impedance matching and transient protection circuits 5 and 8 connected to wire pairs T-R and T'-R', respectively, of the local loop subscriber telephone line. The impedance matching and transient protection circuits 5, 8 serve to match load impedances from the responder system to the telephone company and subscriber telephone lines, and these impedance matching and transient protection circuits 5, 8 also include circuitry for protecting the responder system in known manner against transient electrical surges and spikes on the telephone line as might result from line disconnection, lightning strikes, power lines falling across the telephone line, etc.

It will thus be understood that although not shown, one or more telephone sets may be connected (as by local extension lines) to the local subscriber telephone line (T-R) "upstream" of the telephone interface unit 4 (i.e., between impedance matching and transient protection circuit 5 and the telephone company central office), while the user telephone set U to be used in conjunction with the responder system is installed on the user's telephone line via the responder system, that is, "downstream" of (to the right in FIGS. 1 and 2 of) telephone interface unit 4 and connected to wires T' and R' from impedance matching and transient protection circuit 8. Only the user's telephone set U installed on the downstream line T'-R' to be used in conjunction with the responder system will be affected by the "hook switch" operation modes of the responder system, as described below.

Telephone interface unit 4 also includes a pick-up relay circuit 6. It should be understood that while pick-up relay circuit 6 is depicted as an electro-mechanical relay in FIG. 2, this is merely illustrative and non-limitative, and various alternative means may be employed for implementing the function of pick-up relay circuit 6 including, for example, an electro-mechanical relay, reed relay, solid state relay, solid state analog switch, transistor switch, etc. It is necessary that the means employed for implementing the function of pick-up relay circuit 6 be capable of switching an input local telephone line loop current and voltage alternately between two terminals under control of a command signal from the digital control unit 1 and be able to safely carry the local line loop current and voltage necessary to maintain an "off-hook" condition while the responder system is activated to operably connect the responder system with the telephone line, and to carry the customary signals (i.e. ring voltage, pulse and tone dialling, and signalling and speech signals) normally transmitted on telephone lines. Thus, the pick-up relay circuit 6 is responsible for performing the equivalent hook switch functions of a conventional telephone set, that is, for taking the telephone line off-hook and on-hook (i.e. "picking-up" and "hanging-up" the phone). Pick-up relay circuit 6 is also utilized for operably connecting and disconnecting the responder system's message speech unit 2 to and from the telephone line T-R.

In FIG. 2, pick-up relay circuit 6 is depicted in a deenergized state, i.e. its "normal" state, in which one telephone line wire $T_L$ from impedance matching and transient protection circuit 5 and connected to the movable contact pole P is placed in connection with the normally-closed contact terminal NC which is in turn connected via a corresponding telephone line wire $T'_l$ with impedance matching and transient protection circuit 8. In its depicted "normal" condition, pick-up relay circuit 6 thus, for all practical purposes, serves merely to maintain electrical continuity on telephone line wire T-T' and has no effect on the telephone line. Electrical continuity is also maintained on the other wire R-R' of the two-wire local loop telephone line by line $R_L$ connected between impedance matching and transient protection circuits 5 and 8, so that the responder system in its inactive mode serves as a pass-through extension connection for user telephone set U.

When the responder system is activated by the user as will be more fully described below, the digital control unit 1 operates to send a pick-up command signal over pick-up relay control line K to energize pick-up relay 6. Energizing pick-up relay 6 causes movable contact pole P to move from contact terminal NC to contact terminal NO and this causes line $T_L$ to be disconnected from line $T'_L$ at the normally closed contact terminal NC and causes line $T_L$ to be connected instead with a line $T_K$ at the normally open contact terminal NO.

Connected between lines $T_K$ and $R_L$ there is provided an appropriate telephone line-loading impedance 7 (shown as the block labeled "Z" in FIG. 2) having an impedance value appropriate for developing thereacross electronic speech signals at proper voltages to be delivered by the responder system to the telephone line, and also for drawing sufficient current from the local loop telephone line to maintain the appearance to the telephone company central office of an off-hook condition on the telephone line (i.e., to simulate picking-up a telephone on the line) while the responder system is activated. Also connected to the line $T_K$ is an audio output $A_0$ from the message speech unit 2 for supplying the message speech signal to the line-loading impedance 7 for delivery over the telephone line T-R.

Thus, when the responder system is inactive, the pick-up relay circuit 6 is de-energized and in its normal or "on-hook" state, and, so long as the user's telephone set U connected to line T'-R' is on-hook, then an incoming call on line T-R will be placed on line T'-R' and be received on the user's telephone set U. Taking the user telephone set U off-hook for placing or receiving a call will have no effect upon the responder system.

When the responder system is activated by the user as will be described below, the pick-up relay circuit 6 will be energized under control of the digital control unit 1, causing the line-loading impedance 7 to be operably placed across the telephone line T-R so as to load the line T-R sufficiently to maintain an "off-hook" condition on the line, and at the same time causing the user telephone set U to be effectively disconnected from the line T-R, regardless of whether the user set U is on-hook or off-hook, due to telephone line wire T' being effectively disconnected from wire T of incoming local telephone line T-R.

Thus, energizing of pick-up relay circuit 6 under the control of digital control unit 1 serves to operably connect the responder system's speech signal output $A_0$ to telephone line T-R and at the same time loads line T-R to simulate an off-hook condition on line T-R, (i.e. the equivalent hook switch function of "picking-up" a telephone's handset or "subset" from its cradle). Conversely, deenergizing of pick-up relay circuit 6 under the control of digital control unit 1 operates to disconnect the responder system's speech signal output $A_0$ from the telephone line T-R and to place the responder system in an on-hook condition by unloading the telephone line T-R to simulate "hanging-up" the phone (i.e. the hook switch equivalent of placing a telephone's handset back on its cradle), while also re-establishing connection of the user telephone set U to the telephone line T-R. The pick-up relay circuit 6 allows the modes of operation described for the above-mentioned cases (I), (II) and (III) to be accomplished by the responder system.

Message Speech Unit

Figure 3:
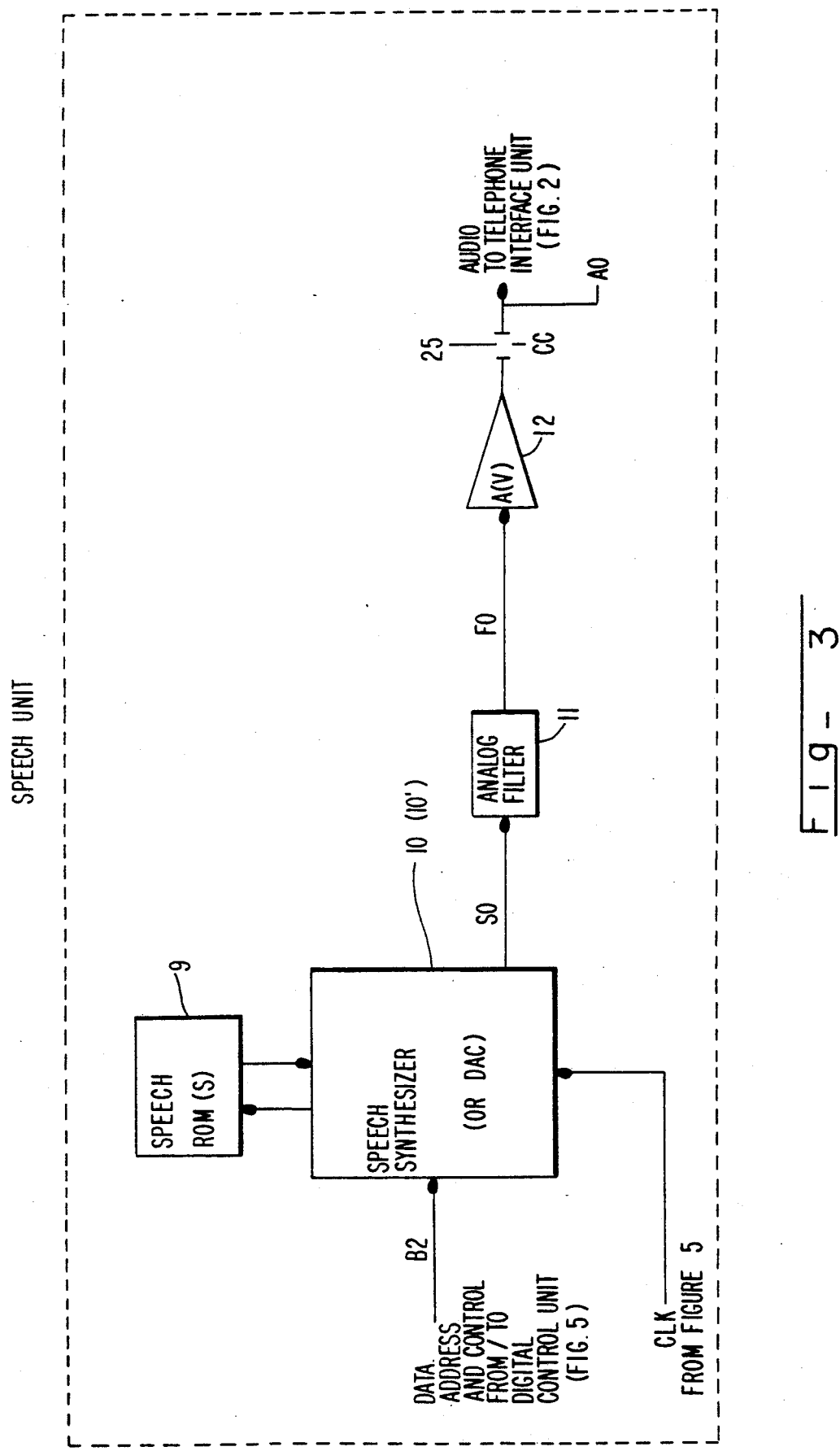
FIG. 3 is detailed block diagram of the message speech unit shown generally in FIG. 1.

Depicted in FIG. 3 is a schematic block diagram of the message speech unit 2 which serves as the message generation means of the present responder system. Advantageously, the present invention can make use of either of two different technologies for forming or "vocalizing" verbal speech messages for delivery as audio signals over the telephone line, namely, electronic speech synthesis and digital-to-analog (D/A) conversion ("digital audio"). Each of these implementations is further described below.

In a first embodiment, the responder system generates verbal speech messages through an electronic speech synthesis process in which pre-programmed digital "vocabulary" data (such as word, phoneme or other phonetic, syllabic, linguistic and formant instruction code data) stored in user-changeable memory modules (message ROMs) are input to a speech synthesizer circuit and, based upon such digital vocabulary input data and upon "pitch" and "inflection" instructions which may be part of the input data or which may be contained in the speech synthesizer's own associated memory (speech ROM), the speech synthesizer circuit operates to generate an analog audio speech signal which is a synthesized-speech vocalized "analog" of the digitally programmed "vocabulary" data. In effect, the speech synthesizer circuit operates as a computer-controlled electronic speech vocalizer by generating audio signals at various frequencies and amplitudes and filtering these audio signals in accordance with digital program control signals from a central controller and externally supplied digital message data input thereto, and internally or externally supplied pitch and inflection data instructions input thereto. Discrete sounds may thereby be generated and combined together to form words, phrases, sentences, etc., in order to closely mimic human speech.

Constituent elements of the message speech unit 2 according to a first embodiment are shown in FIG. 3. A local speech ROM(s) 9 containing pitch and inflection data (and possibly also vocabulary data) is interfaced with (and may be an integral part of) a basic speech synthesizer circuit 10 which is operable to synthetically "vocalize" digital message data input thereto into analog audio speech signals. Speech synthesizer circuit 10 receives the digital message data (i.e. "vocabulary" data or instruction codes specifying vocabulary data held in speech ROM 9) from the digital control unit 1 over a system signal bus $B_2$, and speech synthesizer circuit 10 utilizes the vocabulary data in conjunction with pitch and inflection data from its own local speech ROM(s) 9 or from the input digital message data input to electronically vocalize analog speech therefrom.

The synthesis and vocalization of the vocabulary data and inflection data into a synthesized-speech analog signal is controlled by a clock or timing signal derived from a digital control clock generator 22 of the digital control unit 1 (FIG. 5) and supplied to speech synthesizer circuit 10 over clock signal line CLK.

The "raw" synthesized speech signal is output as an analog signal from speech synthesizer circuit 10 over speech output line $S_0$ and applied to an analog filter circuit II (e.g., lowpass or bandpass) where undesirable components (i.e., remnant clock pulses, noise, etc.) are filtered out of the synthesized speech signal. The filtered analog synthesized speech signal is then applied via line $F_0$ to the input of an audio amplifier circuit 12 where the speech signal is converted to a voltage and current level appropriate for placement on the telephone line wires T-R.

Finally, the filtered and amplified speech signal is AC-coupled from the output of audio amplifier 12 via a coupling capacitor $C_C$ designated at 25 and transmitted via audio output line $A_0$ to the telephone line wires $T_K$-$R_L$ of the telephone interface unit 4. AC-coupling of the analog speech signal is necessary in order to prevent excessive DC voltage on the telephone line from affecting the responder system and to prevent the responder system DC voltage from causing false "off-hook" conditions on the telephone line.

A variety of speech synthesizer integrated circuits (ICs) are commercially available and may be utilized for implementing speech unit 2. Typical speech synthesizer circuits include a speech processor IC and one or more speech memory ICs. Suitable devices include the models TMS5110A and TMS5220 voice synthesis processor ICs with model TMS6100 vocabulary ROM ICs manufactured by Texas Instruments; the model MM54104 speech processor IC with model MM52164 speech ROM ICs manufactured by National Semiconductor and available in combination as the model DT1050 "Digitalker" and expandable for greater vocabulary with the model DT1057 which includes two additional speech ROMs; the model SC-01 speech synthesizer IC from Votrax; and the model PCF8200 CMOS male/female speech synthesizer IC manufactured by Signetics Linear Products. Suitable speech synthesizer ICs are also available from other integrated circuit manufacturers including General Instruments.

The individual speech synthesizer IC manufacturers each use proprietary regimes for speech synthesis, however, the utilization of such speech synthesis ICs is well documented and specified by each manufacturer, so that their implementation as a message generator means in the present invention is considered to be readily practicable by persons of ordinary skill in the art without further specific description herein. For example, the implementation of integrated circuit speech synthesis devices is described in the following: Cheairs, L. S., "Build This Speech Synthesizer", Radio-Electronics, Vol. 53, No. 7, pp. 43–46, 110 (July, 1982); Reese, R. et al., "Speech Board Makes Anything Talk", Computers & Electronics, Vol. 20, No. 12, pp.47–62 (December, 1982); Dighera, L., "Talk Can Be Cheap", Computers & Electronics, Vol. 21, No. 2, pp. 39–40, 47–51 (February, 1983); Glinsky, L. "Build This Talking Alarm Clock", Radio-Electronics, Vol. 54, No. 5, pp. 57–60, 106 (May, 1983); Fike, J. L. et al., Understanding Telephone Electronics, pp. 5–30 to 5–31, Texas Instruments, Inc., Dallas (1983); and "PCF8200 CMOS Male/Female Speech Synthesizer Objective Specifications" from Signetics Linear Products, the disclosures of which are incorporated herein by reference thereto.

Electronic speech synthesis electronically simulates or models the human vocal chords and vocal tract to produce the different so-called "voiced" and "unvoiced" (fricative) sounds of human speech. One speech generation technique widely used in electronic speech synthesizer ICs is a mathematical modelling technique known as "linear predictive coding" (LPC) in which each speech element is mathematically generated in part based upon previously generated elements (speech characteristics tend to change quite slowly) and upon input digital speech vocabulary, pitch and inflection data, thereby reducing input data requirements. Typically, at least two sound or "voicing" generators are utilized: a variable-frequency generator for simulating voiced sounds from the human vocal chords, and a noise generator for simulating unvoiced noise-like speech sounds. Digital speech data (e.g., digitized analog waveforms of voiced and unvoiced sounds and pitch and inflection level codes) stored in onboard memory or in externally-connected speech memory (speech ROM) is input to data inputs of the speech synthesizer IC and phonemes, syllables or words are synthesized by, e.g., a construction algorithm and parametric formant filtering. Some speech synthesizer ICs perform the synthesis digitally, employing digital filters and digital-to-analog conversion (DAC) to output the final analog speech signal.

Digital speech data is used in electronic speech synthesis to determine the characteristics of each sound produced, and contains parameters describing the voice pitch, amplitude and formant filter characteristics for controlling the operation of the speech synthesizer circuit. The digital speech data is produced by first sampling and quantizing spoken speech and then, through a computer analysis, the speech data is heavily compressed and digital parameters describing speech pitch, energy level and vocal tract characteristics are extracted. The speech data is then further compressed and digitally coded into a form appropriate for input to and reading and processing by the speech synthesizer circuit. Some of the commercially available speech synthesizer ICs are designed to accept compressed digital speech data from either specially designed dedicated speech memory (e.g. voice or vocabulary ROMs) containing for example a number of digitally-encoded phonemes, words, etc., or directly from a microprocessor over a digital data bus. In either case, the digital speech data is read from memory by a microprocessor and written to the data inputs of the speech synthesizer IC over a microprocessor interface bus (e.g., data bus).

An advantage of the use of speech synthesizer 10 in the present invention is that a large amount of uniquely addressable digital speech data e.g., over 100 discrete words) can be contained in relatively inexpensive dedicated speech ROM(s) due to data compression and optimization formats adopted by the IC manufacturers, so that the message data necessary to form a particular desired synthesized speech call response message may need only specify the addresses of the particular stored digital vocabulary data (words, phrases, pauses, etc.) required to be written to and processed by the speech synthesizer circuit 10 to form a desired vocalized message, thus minimizing the memory requirements for the message and speech data. Similarly, where the digital speech data is stored in non-dedicated speech memory, the memory requirements for large vocabularies and relatively long messages are advantageously minimized through data compression in forming the speech data. In the present invention, the speech data for each call response message (or a number of individual messages) will preferably be "programmed" into plug-in message memory modules or "chips" (e.g., PROM, EPROM, EEPROM) by the system manufacturer, and users will then be able to equip their responder systems with desired call response and other messages by plugging different available pre-programmed message memory modules into their system unit.

The responder system according to the present invention may, in a further embodiment, make use of digital-to-analog (D/A) conversion (i.e. "digital audio") for producing analog speech signals from digitally pre-recorded message data. This technique typically involves as a requisite the analog-to-digital (A/D) conversion (sampling and quantization) of an analog audio signal into a digital (i.e. binary) data stream representing the analog input signal, and storage of the digital data, so that ultimately, by the converse operation of D/A conversion of the stored digital data into an analog output signal, a very close artifact of the original audio signal may be reproduced (assuming a sufficiently high sampling frequency and an adequate quantization bit resolution). However, in implementing this technique for message generation in the present invention, the messages will be prerecorded (i.e. pre-quantized) into digital data form and stored in non-volatile message memory modules or "chips" to be plugged-in to the responder system by the user for equipping the user's unit with different messages, in much the same manner as that for the digital message data in the above-described embodiment employing speech synthesis, so that it is not necessary to provide a message recording (analog speech input processing and quantization) facility in the responder system itself, thereby reducing the cost of the responder system.

Figure 5:
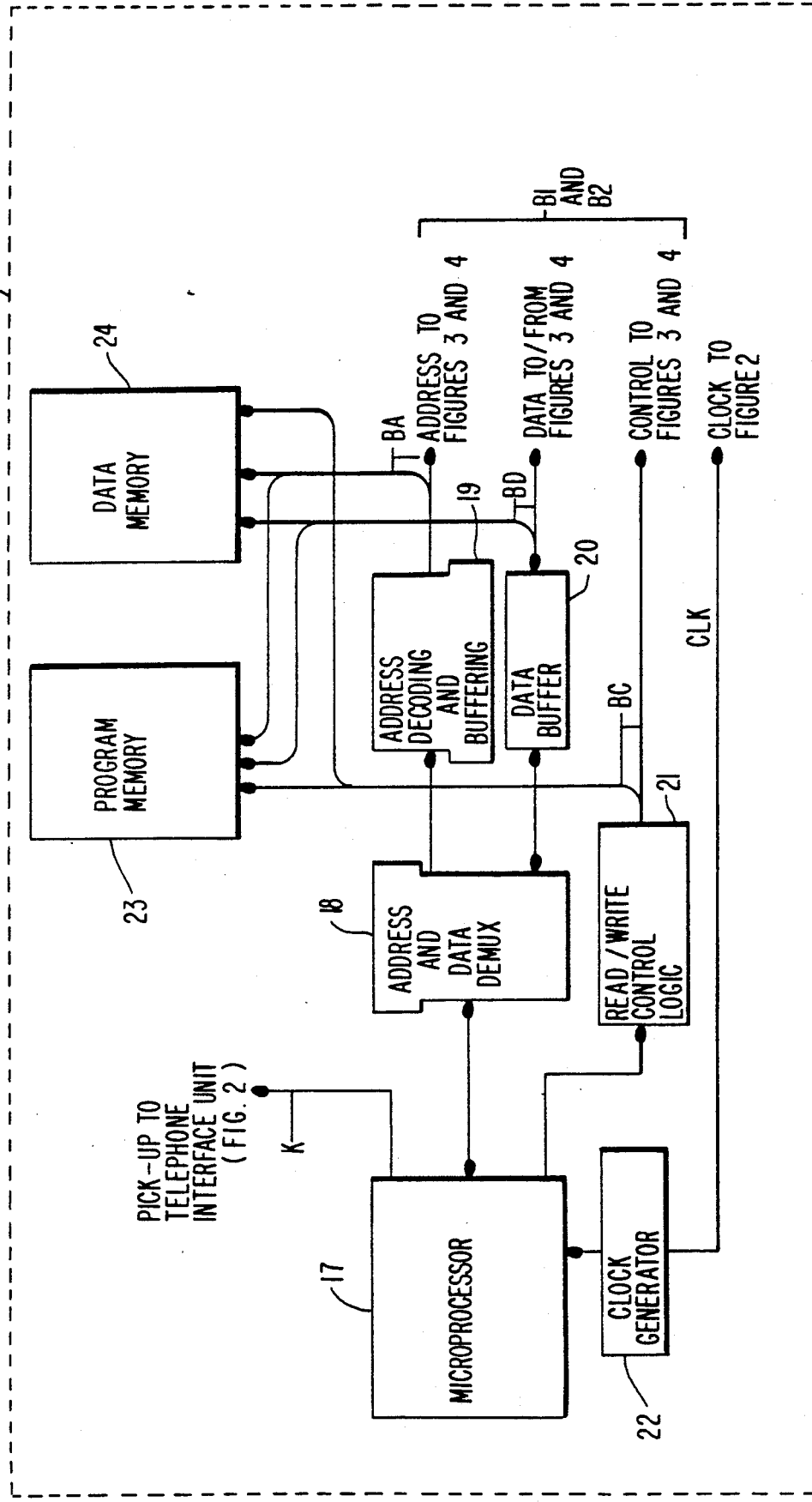
FIG. 5 is a detailed block diagram of the digital control unit shown generally in FIG. 1.

With reference to FIG. 3, the message speech unit according to this further embodiment will employ a digital-to-analog converter (DAC) circuit 10 rather than the speech synthesizer 10 of the previous embodiment (the speech ROM 9 will also not be needed). A variety of suitable DAC devices are commercially available from various manufacturers, and the particulars of their implementation for digital-to-analog conversion in digital audio are well known to those of ordinary skill in the art and thus do not require further detailed description herein for enabling the practicing of this aspect of the invention. Digital speech message data (e.g., quantized speech data), address and control signals are supplied to DAC 10' via bus B$_2$ from the digital control unit 1 (FIG. 5) and a clock signal is also supplied to DAC 10' via line CLK from the digital control unit 1 (FIG. 5). DAC 10' may also be provided with a reference voltage source (not shown) in known manner. The analog speech output from DAC 10' is supplied via line S$_0$ to analog filter 11 for smoothing, anti-aliasing, bandpass, noise removal, etc. and then the filtered analog signal is supplied via line F$_0$ to amplifier 12 and to line-loading impedance 7 of the telephone interface unit 4 in the same manner as described above with respect to the previous embodiment, to be delivered over the telephone line wires.

In implementing D/A conversion for digital audio reproduction of pre-recorded/quantized speech messages in the present responder system, the message memory requirements may necessarily be greater than those for the above-described speech synthesis embodiment because the pre-recorded message data will be of considerable size even for short messages due to the necessity for sampling the analog message input during the recording (quantizing) process at no less than the Nyquist frequency, and also depending upon the quantization bit resolution employed (typically at least 8 bits will be employed, although a greater number of bits will provide more faithful speech reproduction). In the case of telephone speech signals, the voice channel bandwidth has been set at 4,000 Hz (4KHz), so that typically a minimum sampling frequency of 8,000 Hz will be employed (intelligible speech has a bandwidth of approximately 200 Hz to 4,000 Hz). "Companding" (i.e. signal compression prior to quantization and signal expansion after D/A conversion) may be employed in order to reduce the sampling frequency and/or quantization bit requirements.

User Keypad Unit

Figure 4:
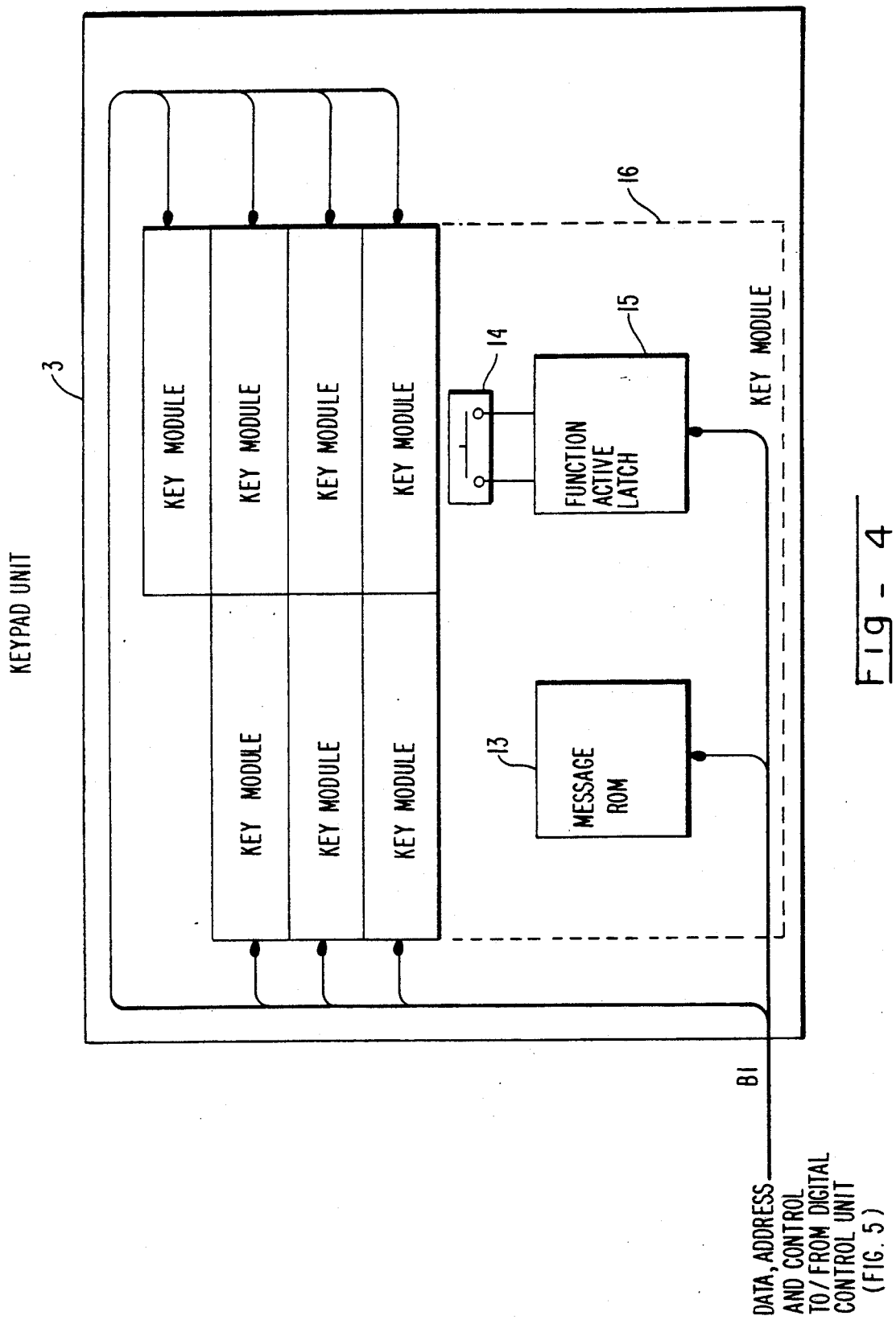
FIG. 4 is a detailed block diagram of the keypad unit shown generally in FIG. 1.

FIG. 4 shows the keypad unit 3 which, for purposes of illustration only, is depicted as having eight control key modules 16 installed therein, one such key module 16 being shown in more detail within the dashed out-line. Each key module includes a manually-actuatable push button key or switch 14, a latch circuit 15 connected to the key 14 for indicating whenever its associated key 14 has been activated, and a non-volatile plug-in message ROM memory device 13 containing pre-programmed vocabulary and associated digital speech data of a message (for speech synthesis) or quantized speech data (for D/A conversion- digital audio) for the message selectable by this particular key 14. The latch circuits 15 and message ROMs 13 are interfaced via a bus $B_1$ with input-output data, address and control lines of the digital control unit 1.

Each key 14 may be provided with a label, legend or other indicia indicating the particular message data stored in its associated message ROM 13, and each message ROM 13 may also be appropriately labeled. The non-volatile memory devices used for message ROMs 13 can be any of the commercially available types such as ROMs, EPROMs or EEPROMs.

Each key module 16 can thus have its own associated message data ROM and all of the key module message ROMs 13 are interchangeable with one another. While in FIG. 4 the keypad unit 3 is shown as having eight key modules, depending upon the particular circumstances the responder system may be configured with any number of key modules, and in order to make such expansion possible it is preferred that the bus $B_1$ of keypad unit 3 have an open architecture so as to be able to accommodate a greater or lesser number of key modules as may be desired. In this way, key modules 16 and message ROMs 13 may be simply plugged into or unplugged from the keypad unit 3, making the responder system easily configurable to different user requirements.

Digital Control Unit

Details of the digital control unit 1 are shown in FIG. 5. A commercially available microcontroller or microprocessor 17 serves as the "brain" of the responder system. Microprocessor 17 governs where data is transferred to and from and when as directed by control program software contained in program memory 23.

Timing for microprocessor 17 (and speech synthesizer circuit 10 or DAC 10' in FIG. 3) is derived from clock signals provided by a clock generator 23 which can be any of several different types of known oscillators, a crystal-controlled clock oscillator being preferred.

Address and data demultiplexer 18 serves to demultiplex the data and address busses of microprocessor 17 if the particular microprocessor utilized requires such demultiplexing. If it is preferred to utilize a microprocessor utilizing separate data and address busses, then demultiplexer 18 may be omitted.

The actual software control program commands executed by microprocessor or microcontroller 17 are stored in program memory 23. Program memory 23 is commercially available non-volatile memory such as ROM, EPROM or EEPROM and may be a self-contained (i.e. "on-chip") programmable ROM integral to the microprocessor 17 in some cases. The stored control program software in program memory 23 contains the instructions which control operation of the responder system, for example, to control scanning of keypad unit 3 by the microprocessor 17, the interpretation by microprocessor 17 of the actuation of the different keys 14, and the delivery of a speech-synthesized or D/A-converted (digital audio) call response message.

Data memory 24 is used by microprocessor 17 for saving data such as intermediate results in address or speech timing calculations. Data memory 24 will typically be commercially available static RAM (SRAM) and may be self-contained within microprocessor 17.

In order for microprocessor 17 to access the commands or data stored in memory, it is necessary for microprocessor 17 to generate a unique address for each piece of information (data) and device. Address decoding and buffering circuit 19 converts these unique addresses into the appropriate enabling signals which are supplied over the address bus $B_A$ to physical memory devices. Data buffer 20 provides bi-directional drive for the data bus $B_D$, assuring that adequate data signal levels are maintained.

The actual direction of data transfer is controlled by the read/write control logic circuit 21 over I/O control bus $B_C$. When microprocessor 17 is requesting data, read/write logic control circuit 21 will enable a read from the appropriate memory device or register. If the microprocessor 17 is sending out data, then read/write control logic circuit 21 enables a write operation to the appropriate memory device or data register. For example, if the microprocessor 17 requests data (e.g. digital or quantized speech data) from the keypad memory (message ROM 13), the read/write control logic 21 will issue a read command to the keypad memory. The microprocessor 17 then requests transmission of the speech data to the speech synthesizer 10 or DAC 10' of the message speech unit 2, and the read/write control logic 21 then issues a write command to the data input registers of the speech synthesizer circuit 10 or DAC 10' to enable transfer of the speech data thereto.

System power requirements may be supplied in known manner from a battery power supply, the electric utility AC or from the telephone company battery current on the telephone line as appropriate.

System Control Program

Having described above the general constituent components of a preferred embodiment of the present responder system, there will now be described an exemplary software control program which may be stored in the program memory 23 of the digital control unit 1 for controlling operation of the responder system.

Figure 6:
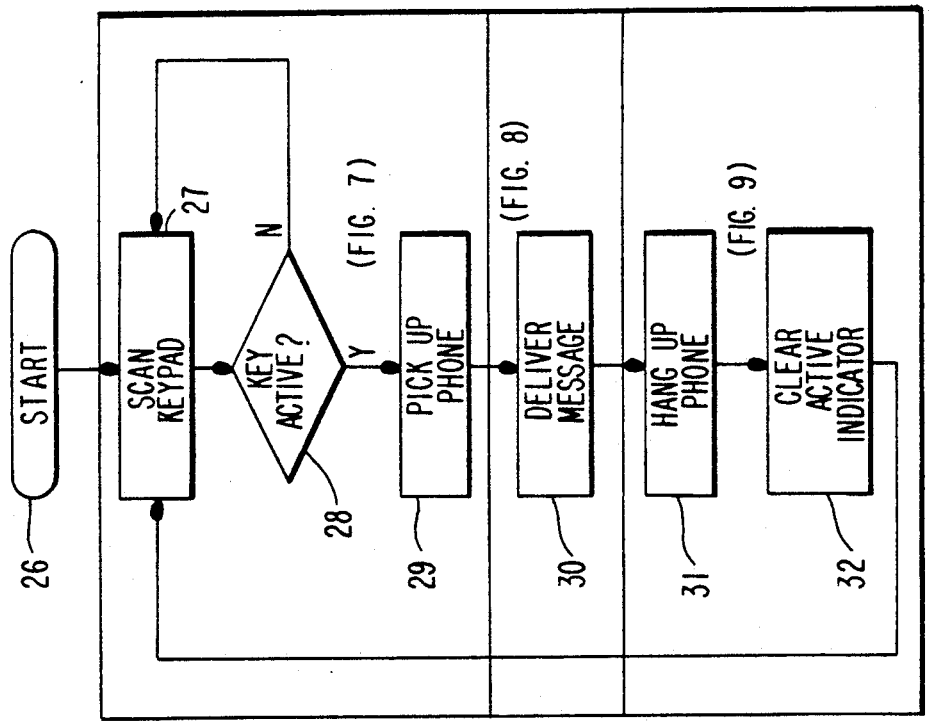
FIG. 6 is a flow chart depicting generalized program steps of a control program for controlling the telephone call responding system of FIGS. 1 through 5.

The general program steps or routines are depicted in block overview by the flow chart in FIG. 6. The system software control program begins at start block 26 and continues to block 27 where the keypad unit 3 is scanned, then proceeds on to decision block 28 whereby it is tested whether the keypad scan in step 27 detected any active (i.e. actuated) keys. If the test at block 28 indicates that a key was not active, then the program loops back to block 27 and keypad scanning is performed again.

If the test at block 28 indicates that a key was active, then the program proceeds on to function block 29 where a command is issued to cause the responder system to "pick-up" the "phone", (i.e., go "off-hook"). From block 29 the program continues to function block 30 where the message corresponding to the active key is delivered over the telephone line. After block 30 is complete, the program continues to function block 31 where a command is issued for the responder system to "hang up" the phone (i.e., go "on-hook"). The program then proceeds to function block 32 which causes the "active" indicator for the keypad key to be cleared, after which the program loops back to block 27 where the process of waiting for an active key begins again.

Figure 7:
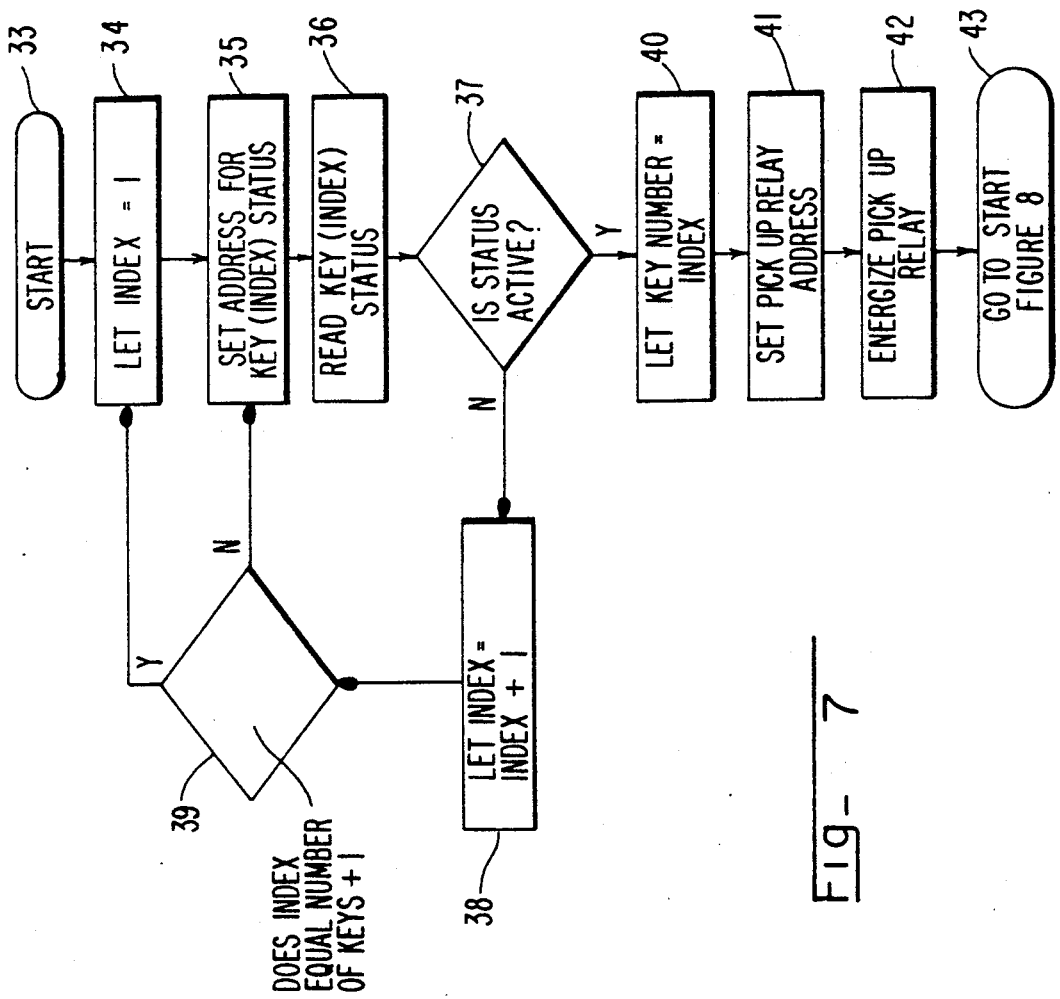
FIG. 7 is a flow chart depicting the "keypad scanning" and "phone pick-up" routines of the control program in FIG. 6.

FIG. 7 details the routines for scanning the keypad and "picking-up" the phone (blocks 27-29 in FIG. 6). The keyboard scanning routine begins at block 33 and proceeds to block 34 where a variable called "index" is initialized to a value of "1". The variable "index" is used to count the number of keys scanned. From block 34 the keypad scanning routine continues to block 35 where the address for the key to be scanned is calculated. All keys in the responder system will have a unique address by which they can be directly selected for scanning. After the address of the key to be scanned is calculated, the routine continues to block 36 where the status of the key having the calculated address is read. The routine then proceeds to decision block 37 where the key status is tested to determine whether the scanned key is active or not. If the test at block 37 indicates the key status to be "active", then the routine continues on to block 40, whereas if the test indicates the key status is not "active" then the routine branches to block 38.

In the case where the key status was not "active" at block 37, then at block 38 the value assigned to the variable "index" is incremented by "1" (incrementing the number of keys scanned) and then the routine continues to block 39 where the value assigned to the variable "index" is tested (compared) to determine whether all of the keys have been scanned. If it is determined that all of the keys have been scanned, then the routine loops back to block 34 where the variable "index" is again initialized to a value of "1" and the process of scanning the keypad starts all over again. If, however, it is determined at block 39 that not all of the keys have yet been scanned, then the keypad scanning routine loops back to block 35 where scanning of the next key is begun.

In the case that the scanned key status tested "active" at decision block 37, then the routine proceeds to block 40 where the active key number is saved by being set as the value of the variable "index", after which the routine proceeds on to block 41 where an address for the pick-up relay 6 (FIG. 2) is calculated. Then the routine continues to block 42 where a command is issued to the calculated pick-up relay address to have the responder system "pick up" the "phone" by energizing the pick-up relay 6, after which control is transferred at block 43 to the "deliver message" routine.

The "deliver message" routine (block 30 in FIG. 6) controls the delivery of a message from the key module message ROM memory 13 (FIG. 4) to the telephone line via the speech unit 2 (FIG. 3) and the telephone interface unit 4 (FIG. 2). As shown in detail in FIG. 8, the "deliver message" routine, having received system control from block 43 of the "pick up phone" routine in FIG. 7, starts at block 44 and then proceeds to block 45 where the address of the message data corresponding to the active key module 16 (FIG. 4) is calculated and set. The routine then proceeds to block 46 where the data signifying the message length (pre-programmed along with the message data in message ROM 13) is read. This message length data (e.g., the number of bytes of data in the selected message) is required so that the digital control unit will know how much data to transfer from the message ROM 13 and when data transfer has been completed. After the message length data has been read, the routine proceeds to block 47 where an index is initialized to the message length value to control the transfer of message data.

The routine then proceeds to block 48 where the address of the speech synthesizer 10 or DAC 10' (FIG. 3) is calculated and saved for later use, then the routine continues at block 49 where the message data address is updated (incremented) to point at the address of the next piece (e.g., byte) of message data in the message ROM 13. Continuing to block 50, the next piece of message data is read out from the message ROM 13, and then the routine at block 51 writes this read-out message data to the speech synthesizer 10 or DAC 10' data inputs, after which the routine proceeds to block 51 where the message length index value (i.e. the number of message data bytes remaining to be processed) is decremented by one (1). The routine then proceeds to decision block 53 where the message length index value is tested to determine whether it is equal to zero (0). If the message length index value is equal to zero at decision block 53, then the message is complete and the routine continues to block 54 where control is passed on to the beginning of the "hang up phone" routine (block 31 of FIG. 6). If, however, the tested message length index value is not equal to zero at block 53, then the "deliver message" routine loops back to block 49 where the process of delivering the message continues as described above.

Figure 8:
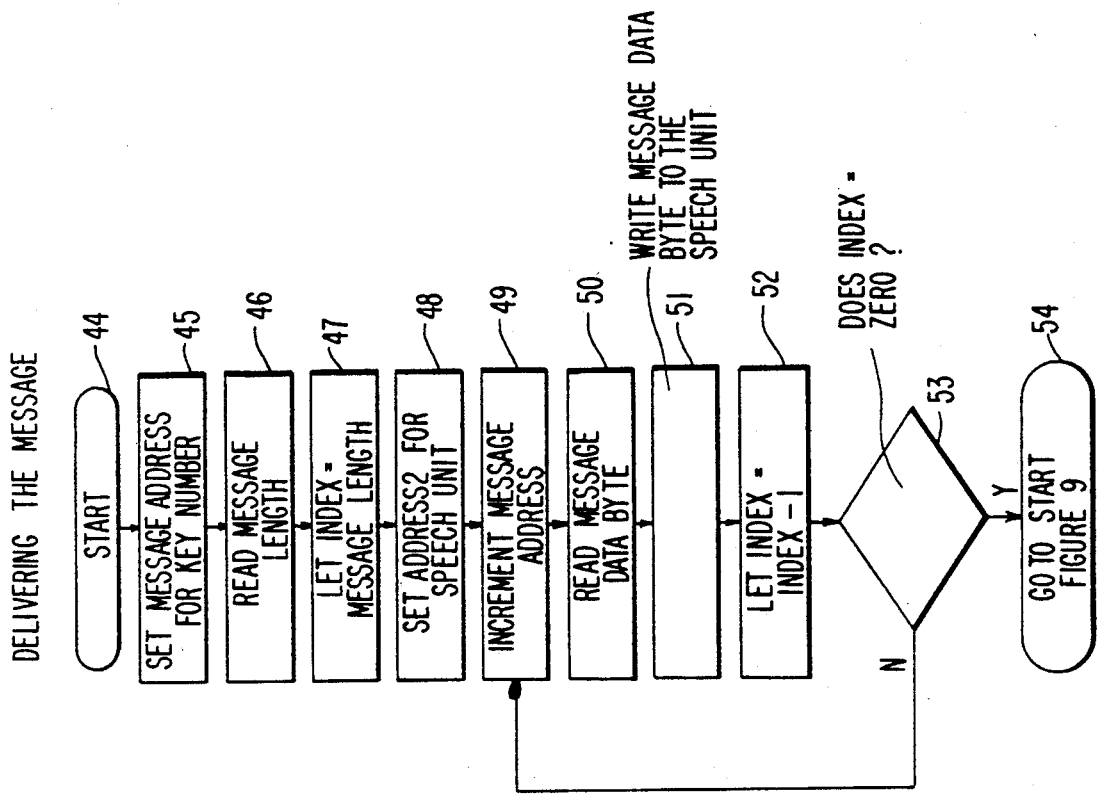
FIG. 8 is a flow chart depicting the "message delivery" routine of the control program in FIG. 6.
Figure 9:
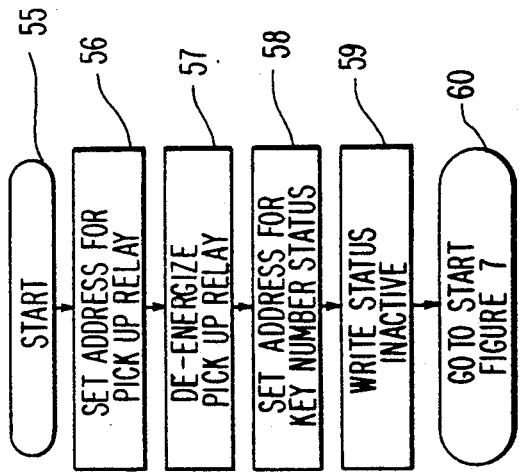
FIG. 9 is a flow chart depicting the "phone hang-up" and "clear active keys" routines of the control program in FIG. 6.

After delivery of the message is completed, control is passed by the "deliver message" routine at block 54 in FIG. 8 to the beginning of the "hang up phone" routine starting at block 55 in FIG. 9 for "hanging up" the telephone and for clearing the system status. From its start at block 55, the "hang up phone" routine proceeds to block 56 where the address of the pick-up relay 6 is calculated (or retrieved from an intermediate memory register), and then the routine continues to block 57 where a command is issued to cause the responder system to "hang up" the telephone by deenergizing the pick-up relay 6 so as to place the telephone line in an on-hook condition. After the pick-up relay de-energization command has been issued at block 57, the "hang up phone" routine passes control to the "clear active indicator" routine (block 32 in FIG. 6) which starts at block 58 in FIG. 9.

The "clear active key indicator" routine begins at block 58 where the address for the "active" key status latch 15 (FIG. 4) is calculated (or retrieved from an intermediate data register), then the routine continues to block 59 where the "active" key status is changed to "inactive", signifying that the selected message has been delivered and that the program execution is completed. From block 59 the routine then ends at block 60 and returns program control back to the beginning of the "scan keypad" routine at block 27 of FIG. 6 ( i.e. the "keypad scan" routine beginning at block 33 in FIG. 7) where the whole process shown in FIG. 6 is begun again by "waiting" for a key 14 (FIG. 4) to be activated by another user actuation of the responder system.

Operation

Operation of the responder system by the user is quite simple. In a typical installation, the user would disconnect the telephone set U line cord from the telephone wall jack outlet, plug the responder system's line cord (from impedance matching/transient protection circuit 5) into the wall jack, and then plug the telephone set U line cord into a telephone jack (connected to impedance matching/transient protect circuit 8) of the responder system's telephone interface unit 4, so that the responder system will then be able to respond to calls received on the connected telephone set U and to control the telephone's connection status with the incoming telephone line.

Taking case (I) described above, when a call is received (i.e. the telephone rings) the user may answer the call in normal fashion using the telephone set U. Should the user determine upon answering the call that it is an unwanted call, for example a sales call, the user would then simply push a key 14 of the responder system corresponding to an appropriate message programmed into an associated message memory ROM 13, for example a "not interested" message. This activates the responder system which will then operate in accordance with the control program described above to connect itself to the telephone line (i.e. "pick up") while at the same time disconnecting the user telephone U from the line, deliver the selected message, and then disconnect itself from the line (i.e. "hang up") thereby disconnecting the unwanted call.

If, as in case II above, the user is busy or unable to personally answer a call, the user can simply push a key 14 of the responder system corresponding with an appropriate message programmed into an associated message memory ROM 13, for example a "please call back later" message. This activates the responder system which will then operate in accordance with the control program described above to connect itself to the telephone line (i.e. "pick up"), deliver the selected message, and then disconnect itself from the line (i.e. "hang up") without it being necessary for the user to answer the telephone U.

If, as in case III above, a person is talking on an extension telephone and the user wishes that person to free the line or get off the phone, the user may, without picking up the telephone set U, activate the responder system by simply pushing a key 14 of the responder system corresponding with an appropriate message programmed into an associated message memory ROM 13, for example a "please get off the phone", "mealtime", "homework time", etc., message. This activates the responder system which will then operate in accordance with the control program described above to connect itself to the telephone line (i.e. "pick up"), deliver the selected message over the telephone line, and then disconnect itself from the line (i.e. "hang up") without disconnecting the person talking on the extension telephone. In this case, the parties on the line will both be able to hear the selected message delivered over the telephone line by the responder system.

Device Configurations

The telephone responder system of the present invention may be embodied in various forms and device configurations.

Figure 10A:
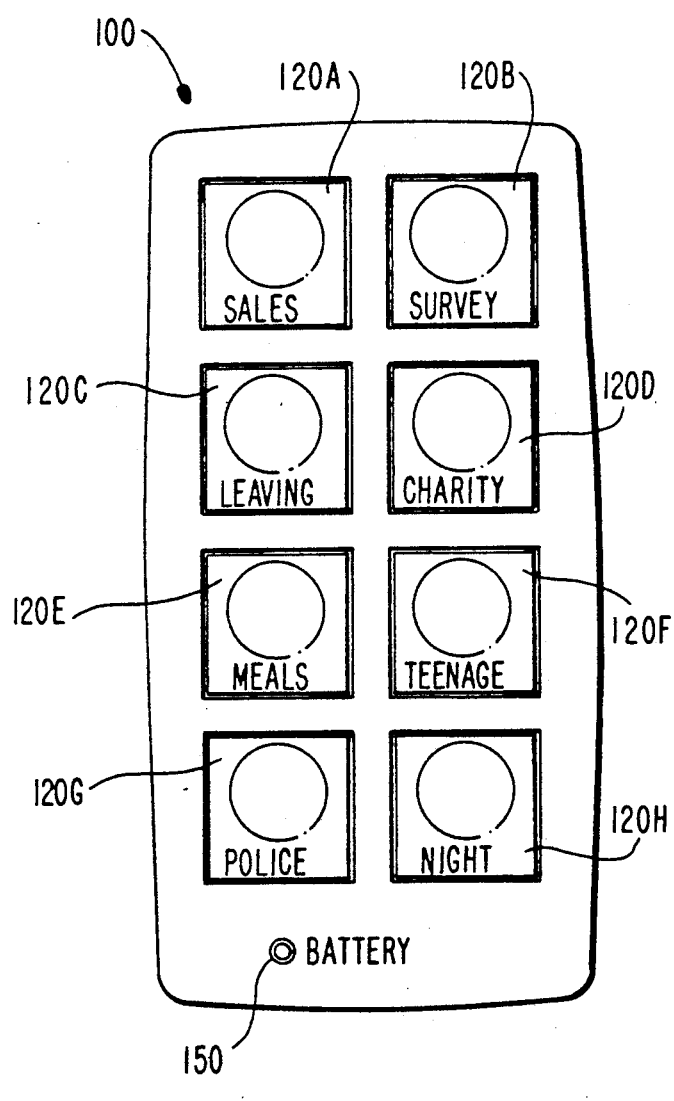
FIGS. 10A and 10B are a plan view and a right side view, respectively, showing a first embodiment of a telephone call responding device according to the present invention.
Figure 10B:
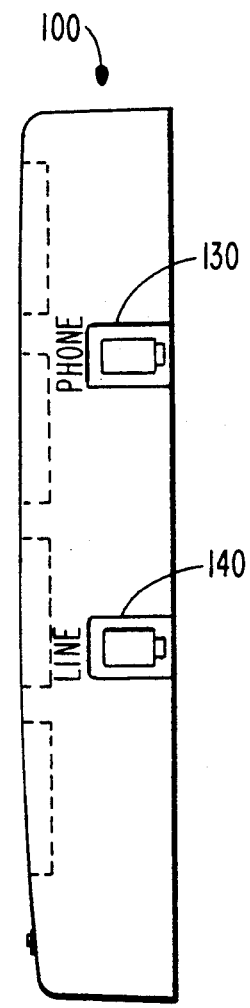

Shown in FIGS. 10A and 10B is a first embodiment of a telephone call responder device 100 intended for use with a user telephone set. Responder device 100 includes an enclosure 110 in which are contained all constituent components of a responder system as previously described. Eight user control buttons 120 are shown provided on a front panel of the enclosure 110, each user control button 120 corresponding to an individual key module of the and being associated with an interchangeable plug-in message ROM of the responder system.

Each button 120 thus will be used to select a different message for delivery over the telephone line. For example, pressing button 120A might select a "not interested" type message such as "I'm sorry, telephone solicitations are not accepted at this number" for responding to unwanted "sales" calls, while pressing button 120B would select an appropriate response message such as "We're sorry, the information you request is personal and private, and we cannot respond to telephone inquiries, thank you" for responding to an alleged "telephone survey" call.

Similarly, button 120C might be pressed to select a message such as "We're just on the way out the door and can't talk now—please call back in an hour or so, thank you", to respond to calls received on departing home, while pressing button 120D might select the message "We're sorry, our charitable contributions are confidential and are not discussed by telephone, thank you", for responding to a caller requesting a donation.

Pressing button 120E might select the message "We're ready to eat—please conclude your call and join us at the table", to inform a family member talking on an extension telephone that it is mealtime, while button 120F might be pressed to select the message "Excuse me, please free up the line to permit another call, thank you", to inform a teenaged family member talking on an extension telephone that the line is needed for another call.

Button 120G might be pressed to select the message "Obscene calls are illegal, and we are notifying the police immediately of this call", to respond to an obscene call. Button 120H might be pressed to select the message "We're sorry, your call cannot be taken at such a late hour—please call again in the morning", to respond to a late night caller after the user has gone to bed and does not wish to be disturbed.

By plugging different message ROMs into the responder device 100, any number of available appropriate pre-programmed messages can be made available for selection by the pressing of the associated buttons 120. An appropriate label or legend can be affixed to or adjacent each button describing its associated message ROM. Other examples of messages available on pre-programmed plug-in message ROMs might include "We're sorry, it's a little early for us to answer the phone—please call back in an hour", to respond to early morning calls, and "I'm sorry, but you have dialed the wrong number—please dial more carefully", to respond to "wrong number" calls.

Responder device 100 may typically include a pair of telephone line cord jacks 130, 140 for connecting the responder device via a line cord to a wall jack and for plugging a user telephone set's line cord into the responder device 100, respectively. Additionally, when the responder device is battery-powered, a low-battery warning indicator 150 driven by a battery voltage-sensing circuit in known manner may be provided on the front panel to warn the user that the battery should be replaced.

Figure 11:
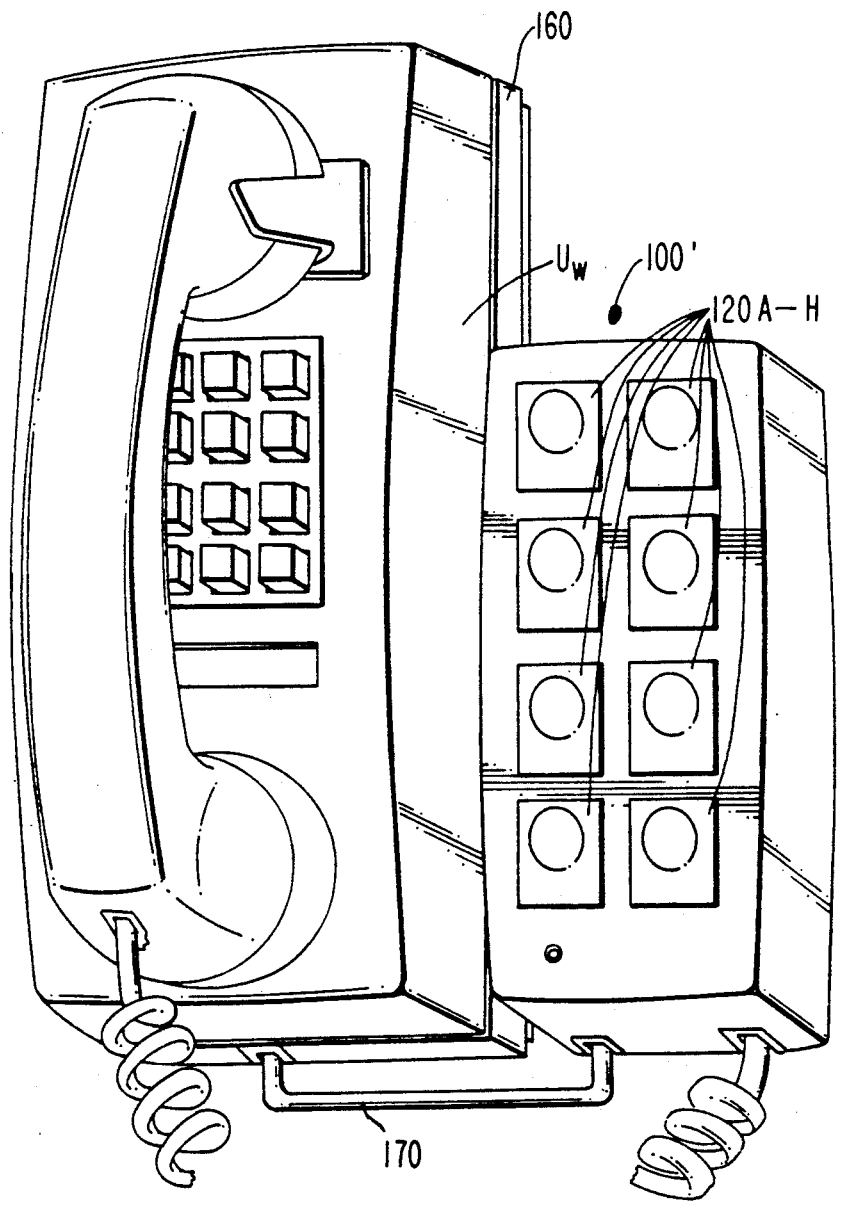
FIG. 11 is a perspective view showing the telephone call responding device of FIG. 10 installed in conjunction with a standard wall telephone.

FIG. 11 shows a responder device 100' which corresponds basically to the responder device 100 of FIG. 10 but which is intended to be used with a user's wall telephone set $U_W$ installation. In the case of a conventional wall telephone installation, the wall telephone $U_W$ may typically have a modular (e.g., USOC RJ11) plug provided extending from a plate at its rear surface which plug is intended to be inserted into a corresponding modular wall jack plate, with the plate on rear of the wall telephone also having stud fittings for engaging slots in the wall jack so as to securely mount the wall telephone to the wall jack plate. In such a case, the responder device 100′ may include a telephone line connection adapter 160 which plugs into and mounts to the wall jack plate and which in turn has a jack and mounting slots to receive the plug and mounting stud fittings on the rear of the wall telephone U$_W$, with the responder device 100′ and the wall telephone U$_W$ being connected to the telephone line by way of this intermediate connection adapter 160.

The responder device 100′ mounts on the wall adjacent the wall telephone set U$_W$, or at any desired location, and a line cord 170 connects the wall telephone line brought out through connection adapter 160 to the telephone interface unit of responder device 100′ and thence from the telephone interface unit of responder device 110′ back through to the connection adapter 160 to the wall telephone set U$_W$, so that the telephone interface unit of responder device 100′ is placed intermediately in the telephone line connection between the wall telephone line jack and the wall telephone set U$_W$. In this way, the responder device 100′ is still able to control the connection and disconnection of a conventional wall telephone set U$_W$ to the telephone line during operation of the responder device 100′ without it being necessary to modify the wall telephone set or the wall telephone line jack installation.

Figure 12B:
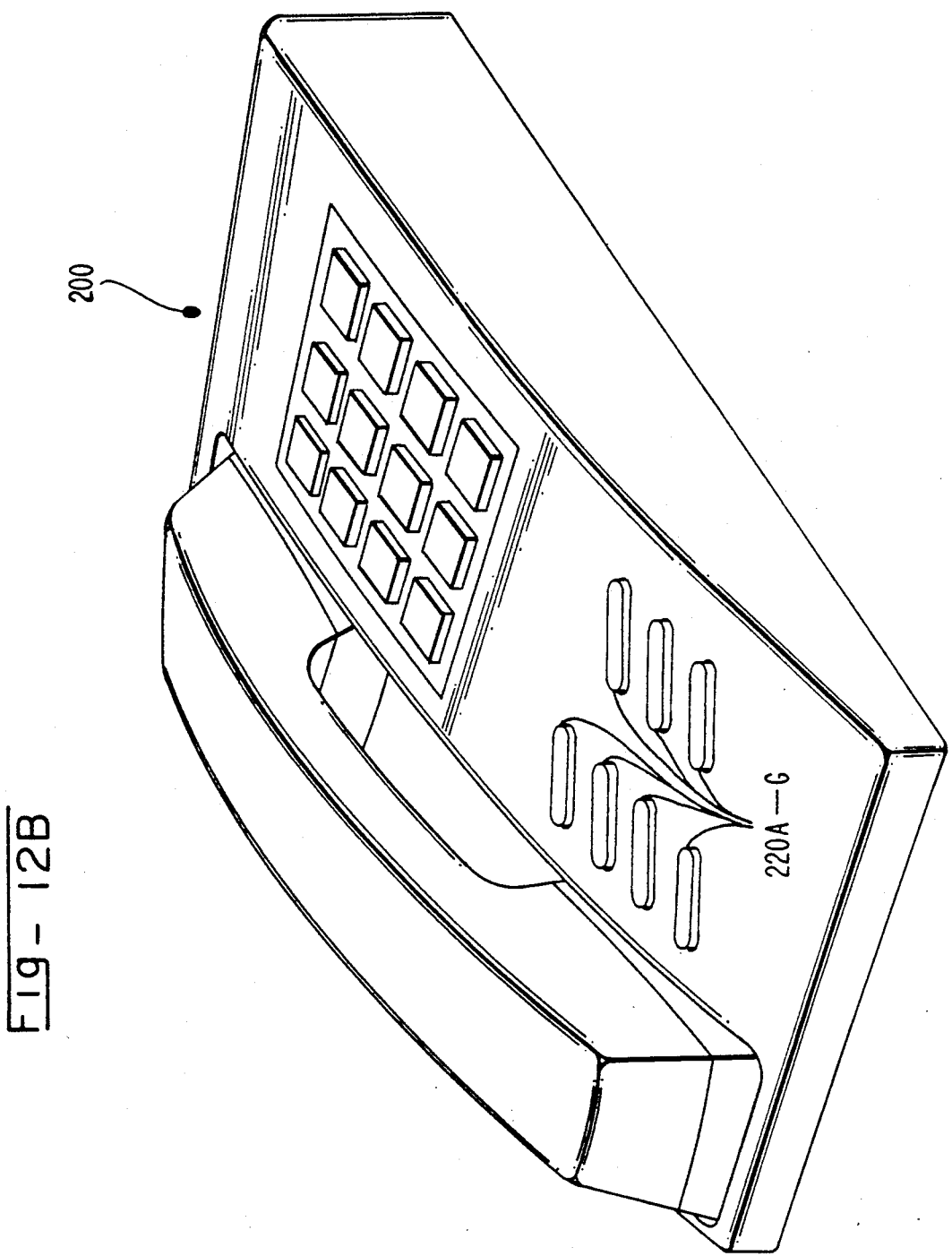

FIGS. 12A and 12B show a further embodiment of a telephone responder device according to the invention. In this case, the responder device is incorporated together with a user telephone set as a single integral telephone-responder unit 200 which incorporates both the normal telephone functions as well as including a responder system actuatable by pushing any of the key buttons 220 provided on the front panel thereof below the telephone dialling keypad. Integral telephone-responder unit 200 may be in the general form of either a desk or wall telephone set. It is noted that seven message-selection key buttons 220A to 220G are illustrated, however, any desired number of message key buttons may be provided.

Figures 13A, 13B:
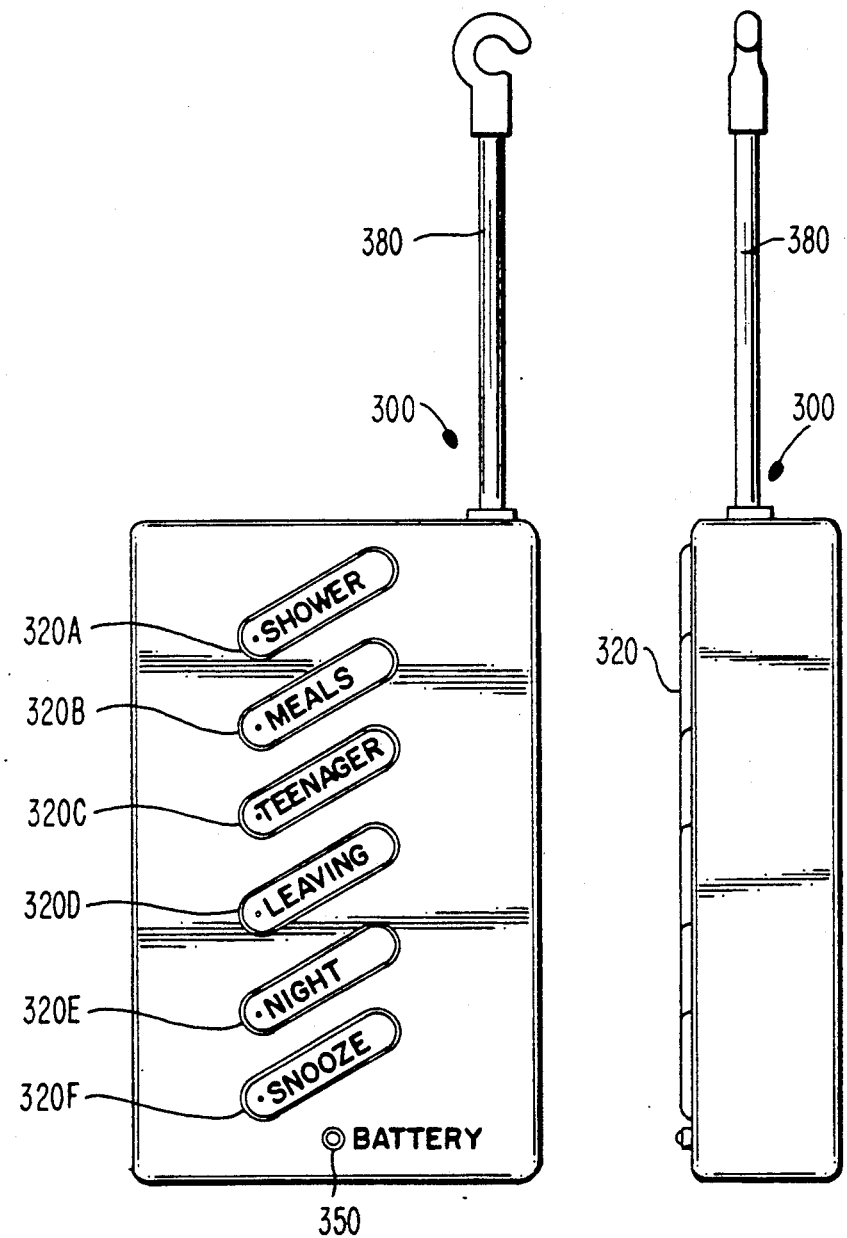

Referring now to FIGS. 13A through 13C there is shown a portable remote key control unit 300 of a further embodiment of the responder device of the invention. In some cases where the responder device is installed in one location on the user's premises, it may be inconvenient for the user to have to go to the responder device's location to activate the responder system when a call is received or to issue a message to a family member talking on the telephone, and in such cases it would be convenient for the user, whatever his or her location on the premises, to be able to remotely actuate the responder system.

In such cases, a remotely-controllable responder device "base station" unit (not shown) containing the responder system components and a remote control receiver may be provided to be installed to the telephone line at a desired location, and the user may utilize the remote key control unit 300 to actuate the responder system functions.

The base station unit might typically take the form of any of the previously described responder devices 100, 100′ or 200 of FIGS. 10, 11 or 12 having user-actuatable message key buttons for selecting desired programmed messages to be delivered, so as to usable as a user-actuatable responder device itself. The base station responder unit will additionally include a remote control receiver (not shown) such as a radio frequency, ultrasonic or infra-red receiver implemented in a known manner which will typically be interfaced with the keypad unit key module circuitry of the base station responder unit so as to be able to selectively cause any of the key status signals on the base station's keypad unit to go "active" in response to receiving an appropriate key control signal from the portable remote key control unit 300.

The remote key control unit 300 is provided with message key buttons 320A to 320F in similar fashion as the base station responder device unit, these key buttons being operably connected to a remote control transmitter also contained in the remote key control unit 300. Actuation of a message key button 320 on the remote key control unit 300 by the user causes a remote key actuation signal identifying that particular key button 320 to be transmitted by the remote control transmitter in the remote key control unit 300 for reception by the remote control receiver in the base station responder device. Reception of the remote key actuation signal at the base station responder device unit then causes the status of the key module key in the base station responder system corresponding to that key actuated by the user on the remote key control unit 300 to be made "active" so as to initiate control program execution for activating the base station unit's responder system for delivering the corresponding message over the telephone line to which the base station responder system unit is installed, in the manner previously described.

The remote key control unit 300 will be useful also for those users who have cordless telephones, since the base station responder device unit can be installed at the cordless telephone set's base station unit while the user may operate the cordless telephone handset unit and/or the responder device remote key control unit from another, remote location. It is contemplated that the remote key control unit 300 may be integrated into a cordless telephone handset, and the responder system base station may similarly be integrated with the cordless telephone base station.

Furthermore, the remote key control unit 300 might be used for example by the user while in the shower or bath and unable to answer the telephone, thereby enabling the user to respond to telephone calls, such as by activating the responder system to deliver a "shower" message requesting the caller to call back at a later time. Remote key control unit may include a low-battery warning indicator 350 on its front panel, and if remote control is to be performed via radio frequency transmission, an external antenna 380 may be provided extending from the unit.

Having now described the telephone responding system, method and device of the present invention, it will be appreciated that given the present description thereof, the invention is amenable to various modifications and adaptations by those of ordinary skill in the art without departing from the spirit and the scope of the invention, which is limited only by the appended claims.

What is claimed:

1. A telephone call responding system, comprising:
   telephone interface means for selectively loading and unloading a two-wire local loop telephone line to establish an off-hook and on-hook condition, respectively, on said telephone line;
   message speech generator means operably connected with said telephone interface means for processing preprogrammed digital speech data into an analog speech signal and outputting said speech signal to said telephone line;

digital control means operably connected with said telephone interface. means and said message speech generator means for controlling the selective loading and unloading of said telephone line by said telephone interface means and for causing the processing of said pre-programmed digital speech data by said message speech generator means when said telephone line is loaded by said telephone interface means, and for causing said telephone interface means to unload said telephone line after output of said speech signal to said telephone line by said message speech generator means has been completed; and keypad means operably connected with said digital control means and said message speech generator means for selecting digital speech data to be processed into an analog message speech signal by said message speech generator means, and for actuating said digital control means to control the loading and unloading of said telephone line by said telephone interface means.

2. The telephone call responding system according to claim 1, wherein said telephone interface means comprises:

line-loading impedance means operably connected with a speech signal output of said message speech generator means and having an impedance value appropriate for developing speech signals input thereto across said telephone line and for drawing sufficient current from said telephone line to maintain an off-hook condition on said telephone line; and pick-up relay means having a control input operably connected with said digital control means for selectively connecting and disconnecting said line-loading impedance means between the two wires of said telephone line for respectively loading and unloading said telephone line in response to respective pick-up and hang-up control signals issued by said digital control means to said control input.

3. The telephone call responding system according to claim 2, wherein said telephone interface means further comprises:

impedance matching and transient protection circuit means for matching load impedances of said telephone call responding system with said telephone line and for protecting said telephone call responding system against transient electrical surges on said telephone line.

4. The telephone call responding system according to claim 1, wherein said message speech generator means comprises:

speech synthesis circuit means for translating digital speech data input thereto into analog speech signals.

5. The telephone call responding system according to claim 4, wherein said message speech generator means further comprises:

analog filter circuit means operably connected with an analog speech signal output of said speech synthesis circuit means for filtering undesirable signal components from said analog speech signals;

audio amplifier circuit means operably connected with said filter circuit means for amplifying said analog speech signals to voltage and current levels appropriate for placement on a telephone line; and coupling capacitor means operably connected between an output of said audio amplifier means and said telephone interface means for AC-coupling said analog synthesized speech signals to said telephone line.

6. The telephone call responding system according to claim 1, wherein said message speech generator means comprises:

digital-to-analog converter circuit means for converting quantized speech data input thereto into analog speech signals.

7. The telephone call responding system according to claim 6, wherein said message speech generator means further comprises:

analog filter circuit means operably connected with an analog speech signal output of said digital-to-analog converter circuit means for filtering undesirable signal components from said analog speech signals;

audio amplifier circuit means operably connected with said filter circuit means for amplifying said analog speech signals to voltage and current levels appropriate for placement on a telephone line; and coupling capacitor means operably connected between an output of said audio amplifier means and said telephone interface means for AC-coupling said analog synthesized speech signals to said telephone line.

8. The telephone call responding system according to claim 1, wherein said digital control means comprises:

controller means having digital data and address input and output registers and ports operably connected with said keypad means and said message speech generator means, and having a control output operably connected with a control input of said telephone interface means, for receiving key selection data signals from said keypad means and for transferring digital speech data from said keypad means to said message speech generator means, and for transmitting pick-up and hang-up control signals to said telephone interface means, respectively;

program memory means operably connected with said controller means for supplying control instructions to said controller means; and data memory means operably connected with said controller means for receiving therefrom, temporarily storing and outputting thereto digital data.

9. The telephone call responding system according to claim 8, wherein said controller means comprises a microprocessor.

10. The telephone call responding system according to claim 8, wherein said program memory means comprises non-volatile read-only memory containing pre-programmed digital control instruction data.

11. The telephone call responding system according to claim 8, wherein said data memory means comprises volatile read-write memory.

12. The telephone call responding system according to claim 8, wherein said digital control means further includes:

read/write control logic means operably interconnecting said controller means, program memory means, data memory means, keypad means and message speech generator means for controlling the reading and writing of digital data therebetween;

address decoding means operably interconnecting said controller means, program memory means, data memory means, keypad mean and message speech generator means for controlling the addressing of individual digital data input and output registers and digital data memory locations thereof;

data buffer means operably interconnecting said controller means, program memory means, data memory means, keypad means and message speech generator means for providing adequate data signal levels therebetween; and clock means operably connected with said controller means and said message speech generator means for providing clock cycle signals thereto.

13. The telephone call responding system according to claim 12, wherein said digital control means further includes:

address and data demultiplexer means operably interconnecting said controller means with said address decoding means and said data buffer means for demultiplexing address and data signals input and output therebetween.

14. The telephone call responding system according to claim 1, wherein the keypad means includes at least one key module, each said key module comprising:

control key means actuatable by a user for selecting a call response message to be delivered over the telephone line;

latch means operably connected with said control key means and said digital control means for indicating when said control key means have been actuated by the user; and message memory means operably connected with said digital control means for containing digital speech data corresponding to said call response message to be delivered over said telephone line.

15. The telephone call responding system according to claim 14, wherein said message memory means is a plug-in non-volatile solid state programmable-read-only memory (PROM) device and wherein said digital speech data is programmed therein.

16. A telephone call responding device for connection to a subscriber telephone line, comprising:

keypad means having a plurality of control keys each associated with a different pre-programmed verbal message stored in digital data form, each of said keys being manually-actuatable for delivering a verbal message associated therewith over a telephone line;

message speech generator means operably connected with said keypad means, for processing said digital message data stored in said keypad means into an analog speech message;

digital control means operably connected with said keypad means and said message speech generator means, for sensing actuation of any of said plurality of control keys of said keypad means and in response thereto issuing a phone pick-up command and causing said message speech generator means to process the stored digital message data associated with said actuated key into an analog speech signal; and telephone interface means operably connected with said digital control means and with an analog speech signal output of said message speech generator means and selectively connectable with a telephone line, for, when said telephone interface means is connected with said telephone line and in response to said pick-up command from said digital control unit, placing said telephone line in an off-hook condition and operably connecting the analog speech signal output of said message speech generator means to said telephone line for causing said analog speech signal to be delivered over said telephone line.

17. The telephone call responding device according to claim 16 wherein said telephone interface means includes:

telephone connection means for connecting a telephone set thereto and with said telephone line; and pick-up relay means operably connected with said digital control means for, in response to said phone pick-up command from said digital control means, disconnecting said telephone set from said telephone line.

18. A method for controlling a telephone call responding system having a keypad means including a plurality of control keys each associated with a different preprogrammed message stored as a digital speech data representation thereof, a message speech generator means for processing digital speech data into an analog speech signal, and a telephone interface means connectable with a telephone line for placing the telephone line in an off-hook condition and for delivering the analog speech signal output of the message speech generator means over the telephone line, the method comprising:

(a) detecting the actuation of any of said control keys;

(b) upon detecting actuation of any one of said control keys, causing the telephone interface means to place the telephone line in an off-hook condition and to connect the analog speech signal output of the message speech generator means to the telephone line;

(c) causing the message speech generator means to process the stored pre-programmed digital speech data representing the message corresponding to the particular key actuated into an analog speech signal and to output said analog speech signal over the line; and (d) upon completion of the outputting of said analog speech signal over the telephone line, causing the telephone interface means to place the telephone line in an on-hook condition and to disconnect the analog speech signal output of the message speech generator means from the telephone line.

19. The method according to claim 18, where the keypad means further has scannable latch means associated with each of said keys and outputting a unique key active signal for indicating when each key has been actuated, and wherein the aforesaid step (a) of detecting the actuation of any of said keys comprises:

scanning the latch means of the keypad means for detecting any key active signals indicating actuation of any of said keys.

* * * * *